US011829556B2

(12) United States Patent
McCulloch et al.

(10) Patent No.: US 11,829,556 B2
(45) Date of Patent: Nov. 28, 2023

(54) METHODS FOR CONFIGURING TOUCH SENSOR SYSTEM

(71) Applicant: 1004335 ONTARIO INC., Ottawa (CA)

(72) Inventors: Robert Donald McCulloch, Ottawa (CA); Albert M. David, Manotick (CA); Guy Michael Amyon Farquharson Duxbury, Ottawa (CA)

(73) Assignee: 1004335 ONTARIO INC., Ottawa (CA)

( * ) Notice: Subject to any disclaimer, the term of this patent is extended or adjusted under 35 U.S.C. 154(b) by 0 days.

(21) Appl. No.: 17/654,376

(22) Filed: Mar. 10, 2022

(65) Prior Publication Data
US 2022/0291773 A1 Sep. 15, 2022

Related U.S. Application Data

(60) Provisional application No. 63/160,372, filed on Mar. 12, 2021.

(51) Int. Cl.
*G06F 3/041* (2006.01)
*G06F 3/044* (2006.01)
(Continued)

(52) U.S. Cl.
CPC ............ *G06F 3/0418* (2013.01); *G06F 3/044* (2013.01); *G06F 3/045* (2013.01);
(Continued)

(58) Field of Classification Search
CPC ........ G06F 3/0418; G06F 3/044; G06F 3/045; G06F 3/04847; G06F 3/04883; G06F 2203/04104
See application file for complete search history.

(56) References Cited

U.S. PATENT DOCUMENTS

| | | | |
|---|---|---|---|
| 5,936,615 | A | 8/1999 | Waters |
| 7,372,456 | B2 | 3/2008 | McLintock |

(Continued)

FOREIGN PATENT DOCUMENTS

| | | | |
|---|---|---|---|
| CN | 101533326 A | | 9/2009 |
| WO | 199624923 A1 | | 8/1996 |
| WO | 2009/034313 A2 | | 3/2009 |

OTHER PUBLICATIONS

Steve Kolokowsky et al. "Touchscreens 101: Understanding Touchscreen Technology and Design" Cypress Perform, Jun. 2009, <www.planetanalog.com> (5 pages).
(Continued)

*Primary Examiner* — Michael Pervan
(74) *Attorney, Agent, or Firm* — Bookoff McAndrews, PLLC

(57) ABSTRACT

A method is provided for configuring a touch sensor controller coupled to a touch panel and a host computing device. The method includes receiving, by the controller, first input for starting a configuration mode of operation. The first input may be received independent of the host computing device. The controller initiates the configuration mode of operation responsive to the first input. The controller receives at least one second input via the touch panel for configuring at least one operational setting of the controller. The method also includes configuring, by the controller, the at least one operational setting according to the received at least one second input.

22 Claims, 12 Drawing Sheets

(51) Int. Cl.
*G06F 3/045* (2006.01)
*G06F 3/04847* (2022.01)
*G06F 3/04883* (2022.01)

(52) U.S. Cl.
CPC ...... *G06F 3/04847* (2013.01); *G06F 3/04883* (2013.01); *G06F 2203/04104* (2013.01)

(56) References Cited

U.S. PATENT DOCUMENTS

| | | |
|---|---|---|
| 9,052,771 B2 | 6/2015 | Goertz et al. |
| 2007/0074913 A1 | 4/2007 | Geaghan et al. |
| 2008/0036742 A1 | 2/2008 | Garmon |
| 2008/0042999 A1 | 2/2008 | Martin |
| 2008/0117183 A1 | 5/2008 | Yu et al. |
| 2012/0044188 A1 | 2/2012 | Prendergast et al. |
| 2012/0287087 A1 | 11/2012 | Lu et al. |
| 2013/0241874 A1 | 9/2013 | Long et al. |
| 2014/0168140 A1 | 6/2014 | Sasselli et al. |
| 2015/0029159 A1 | 1/2015 | Lyle et al. |
| 2016/0188181 A1 | 6/2016 | Smith |
| 2018/0121081 A1 | 5/2018 | Barsness et al. |
| 2018/0300470 A1 | 10/2018 | Chih et al. |
| 2021/0096721 A1 | 4/2021 | Beuker et al. |

OTHER PUBLICATIONS

Zack Whittaker "This USB firewall protects against malicious device attacks" Mar. 9, 2017, <https://www.zdnet.com/article/this-usb-firewall-protects-against-malicious-device-attacks/> (9 pages).
Anmol Sachdeva "Armadillo is an Open-Source "USB Firewall" Device to Protect You Against USB Attacks" Fossbytes, Jul. 18, 2019, <https://fossbytes.com/armadillo-usb-firewall-device/#:~:text=Armadillo%20is%20an%20open%2Dsource%20portable%20device%20that%20acts%20as,been%20infected%20with%20malicious%20firmware> (8 pages).
Adarsh Verma "This Tiny USB Firewall "USG" Protects You From Hacking Attacks—Here's How to Build It" Fossbytes, Mar. 14, 2017, <https://fossbytes.com/usb-firewall-usg/> (7 pages).
A D Metro "Cyber Security Relating to Touch Technology" A D Metro White Paper, retrieved from <https://admetro.com/news/whitepaper-cyber-security-relating-to-touch-technology/> (9 pages).
Combined Search and Examination Report on UK Patent Application No. GB2201446.8 dated Sep. 9, 2022 (11 pages).
Combined Search and Examination Report on UK Patent Application No. GB2203369.0 dated Oct. 13, 2022 (10 pages).

METHODS FOR CONFIGURING TOUCH SENSOR SYSTEM

RELATED APPLICATION

This application claims priority to U.S. Provisional Patent Application Ser. No. 63/160,372, filed on Mar. 12, 2021, the entire disclosure of which is incorporated by reference.

FIELD OF THE DISCLOSURE

The present disclosure relates to touch sensor systems including a touch panel and a controller coupled to the touch panel. More particularly, the present disclosure relates to touch sensor systems that are configurable to set or modify one or more operational settings of the system.

BACKGROUND

Touch sensor systems detect the location(s) of one or more touches on a touch sensor panel (referred to as a "touch panel" herein). A touch sensor system may include a touch panel and a controller coupled to the touch panel. A controller may receive and process signal outputs from the touch panel to determine the touch location(s). Typical touch sensor systems sense touches on the touch panel in two dimensions (e.g. X-axis and Y-axis coordinates of a contact position). Some systems combine touch sensor capabilities with display capabilities, such as touchscreen systems.

Touch sensor systems may be "single-touch" or "multi-touch" systems. For example, a two-touch capable touch sensor system can resolve and distinguish two concurrent touch contact positions. Single-touch systems, on the other hand, detect only a single touch contact at a given time. Touches may be in the form of "gestures." A "gesture" is a function activated by moving the touch contact position or positions along the surface of the sensor in a pattern, where the pattern is detected by the controller or a host computing device coupled to the controller that received touch information from the controller. A function corresponding to the gesture may then be performed. For multi-touch sensors the most commonly used multi-touch gestures are "pinch", "zoom" and "rotate", which are two-touch gestures.

Two common types of touch sensor systems include "capacitive" touch sensor systems and "resistive" touch sensor systems. An example capacitive touch sensor system is a projected capacitive (PCAP) touch sensor system (e.g. for a touchscreen). A PCAP touch sensor typically comprises a two-dimensional criss-cross array of substantially transparent conductive electrodes arranged on a substrate layer. The electrodes may be arranged in a series of rows and columns. The rows are separated by a non-conductive layer from the columns. A protective top layer of glass or plastic will typically cover the substrate layer and the conductive strips. Electronic signals, such as pulses (with well controlled frequency content), may be input to a first plurality of electrodes of the sensor either collectively or individually. Electronics in a touch sensor controller measure signal outputs of a second plurality of electrodes of the sensor. The signal outputs will have detectable characteristics that are a function of capacitance between electrode rows and columns. Touches by a finger (or other conductive object) affect the capacitance between the shaped features (e.g. pads) of adjacent row and column electrodes by diverting coupling electric fields towards the effectively grounded finger. Thus, changes in capacitance of and between rows and columns due to the touches may be detected by monitoring signal output from the electrodes.

Capacitive touch panels may comprise a grid of vertical ("Y") "channels" and horizontal ("X") "channels" where each channel comprises at least one electrode. Horizontal channels of a touch capacitive touch sensor may also be referred to as "rows" herein, and vertical channels may also be referred to as "columns."

A controller for a capacitive touch sensor system may be operatively connected to a capacitive touch panel. The controller may, for example, be configured to individually and selectively drive rows of the touch panel and to receive signal outputs from the columns (or vice versa). The driven channels may be referred to as "transmit channels" and the channels providing signal outputs may be referred to as "transmit channels." Various arrangements of transmits and receive channels may be used. The controller may analyze the signal outputs to determine location of touch contacts (e.g. fingers or other objects touching the touch sensor).

"Resistive" touch panels typically comprise first and second conductive layers of, which may be transparent. The conductive layers are slightly separated by an insulating gap layer (e.g. air or liquid). The first layer may be referred to as the "front" layer herein and the second layer may be referred to as the "rear" layer herein. The front layer overlies the rear layer. The front layer may be sufficiently flexible to bend slightly when touched to contact the back layer. The two conductive layers of the touch panel typically each comprise a thin sheet having face coated with a conductive material, and the conductive faces of the layers face each other (separated by the gap layer). Voltages between electrodes positioned on the first and/or second layers are dependent on location(s) of touches on the first surface that create temporary contact points between the conductive surfaces of the front and back conductive layers. Thus, voltages may be measured and processed to determine touch location(s).

Touch panels may have various characteristics, such as size, aspect ratio, orientation, glass cover thickness, and more. A controller for a touch panel may be configurable to modify various operational settings of the touch sensor system based on such characteristics and user preferences.

A touch sensor system may be operatively connected to a host computing device. The host computing device may be operatively connected to a display. The display may be positioned under the touch sensor (e.g. for a touchscreen arrangement) or the display may be remote from the touch sensor. Typically, for manually configuring a touch sensor, the host computing device runs special configuration software that interfaces with the controller. For the configuration process, the software running on the host computing device may receive user input to set or modify operational settings of the touch sensor. The user input may correspond to operational settings for the touch sensor and may be entered using the touch sensor, other input devices connected to the host computing device or a combination of these.

SUMMARY

According to an aspect, there is provided a method for configuring a touch sensor controller coupled to a touch panel and a host computing device, the method comprising: receiving, by the controller, first input for starting a configuration mode of operation; initiating, by the controller, the configuration mode of operation responsive to the first input; receiving, by the controller, at least one second input via the touch panel for configuring at least one operational setting of the controller; and configuring, by the controller, the at least one operational setting according to the received at least one second input.

In some embodiments, the first input is received independent of the host computing device.

In some embodiments, the at least one operational setting comprises at least one of: a sensitivity setting; a number of concurrent touches setting; a touch panel orientation setting; a reset setting; and a calibration setting.

In some embodiments, initiating the configuration mode of operation comprises mapping a plurality of zones of the touch panel to a plurality of configuration control functions according to a configuration control layout.

In some embodiments, configuring the at least one operational setting comprises configuring the at least one operational setting according to the received at least one second input and the plurality of configuration control functions.

In some embodiments, each of the plurality of zones of the touch panel is configured as a respective configuration control operable to receive user input to configure a respective one or more of the at least one operational setting.

In some embodiments, the method further comprises sending a signal to the host computing device for causing the host computing device to display, on a display coupled to the host computing device, an image indicative of the configuration control layout.

In some embodiments, mapping the plurality of zones of the touch panel to a plurality of configuration control functions and receiving the at least one second input is performed independent of the host computing device.

In some embodiments, the plurality of zones comprises one or more corner zones of the touch panel, the one or more corner zones being mapped to orientation control functions for selecting an orientation for normal operation of the touch panel.

In some embodiments, at least one of the first input or the at least one second input comprises one or more touch gestures.

In some embodiments, the first input is received via the touch panel.

In some embodiments, the method further comprises implementing a configuration mode activation control on the touch panel, wherein the first input comprises a touch of the configuration mode activation control.

In some embodiments, receiving the first input comprises detecting that the touch of the configuration mode activation control has been continuous for at least a threshold duration.

In some embodiments, the controller comprises an input device, and the first input is received from the input device.

In some embodiments, the input device comprises a button.

In some embodiments, the first input comprises one or more touches in one or more edge zones of the touch sensor.

In some embodiments, each of the one or more touches is in a respective different one of the one or more edge zones.

In some embodiments, each of the one or more touches is sustained for a defined duration.

In some embodiments, the one or more touches in one or more edge zone of the touch panel comprises one touch in one of the edge zones, and the controller determines an orientation of the touch panel as a function of the one edge zone.

In some embodiments, if no touch panel input is received for a threshold time, the controller ends the configuration mode of operation and reverts the at least one operational setting to a state prior to the initiation of the configuration mode of operation.

In some embodiments, the method further comprises after initializing the configuration mode of operation, performing a calibration process, the calibration process comprising receiving input corresponding to a set of fiducial points.

According to another aspect, there is provided a touch sensor system comprising: a touch panel; a controller coupled to the touch panel and operable to perform a method as described above or below.

According to another aspect, there is provided a controller comprising: one or more processors; and memory storing processor-executable instructions that, when executed by the one or more processors, cause the one or more processors to implement a method as described above or below.

Other aspects and features of the present disclosure will become apparent to those ordinarily skilled in the art, upon review of the following description of the specific embodiments of the disclosure.

BRIEF DESCRIPTION OF THE DRAWINGS

The present disclosure will be better understood having regard to the drawings in which.

DETAILED DESCRIPTION

As noted above, a host computing device coupled to a touch sensor system may execute special configuration software for configuring the touch sensor system. The term "host computing device" refers to any electronic processing device capable of interfacing a touch sensor system to receive touch information including, but not limited to: a mobile electronic device; a client computer, a microcontroller, or any other device having circuitry for interfacing with a touch sensor controller. The host computing device, the display, and the touch sensor system may all be part of a single apparatus, such as a smartphone, mobile computer, or machinery having a touchscreen, to name a few examples.

For configuration of the touch sensor system, the host computing device may need to execute first software for normal operation of the touch sensor system and second software (i.e. "configuration software") for configuring the touch sensor system. In some embodiment, the host computing device may run an operating system, application software and one or more drivers. The first software may, for example, be part of application software, or a driver run on the operating system. The driver(s) may allow multiple applications to communicate with one or more peripheral devices such as the touch sensor controller. Rather than a operating system and/or driver software arrangement, the host computing device may comprise a microcontroller running the first software, which may directly communicate with the touch sensor controller. In still other embodiments, the first software may run within a different computing architecture than either of the two common architecture examples described listed above.

The configuration by the second software may include calibration of the touch sensor system and/or configuring other operational settings such as sensitivity, orientation, etc. A user may need to install and run the second software on the host computing device to set or alter configuration settings. During operation of this second software, the second software may effectively "take over" communication with the touch sensor controller so direct communication between the touch sensor controller and the host computing device's first software (for normal operation) is cut off.

However, this approach may be inconvenient for some users. By way of example, configuration software executing on the host computing device to configure the touch sensor system may encounter problems related to firewalls, operating system compatibility, software installation difficulties, virus concerns, and/or other potential issues. Thus, it may be desirable to implement a method of configuring a touch sensor system that reduces or eliminates the involvement of the host computing device in the configuration process.

Figure 1A:
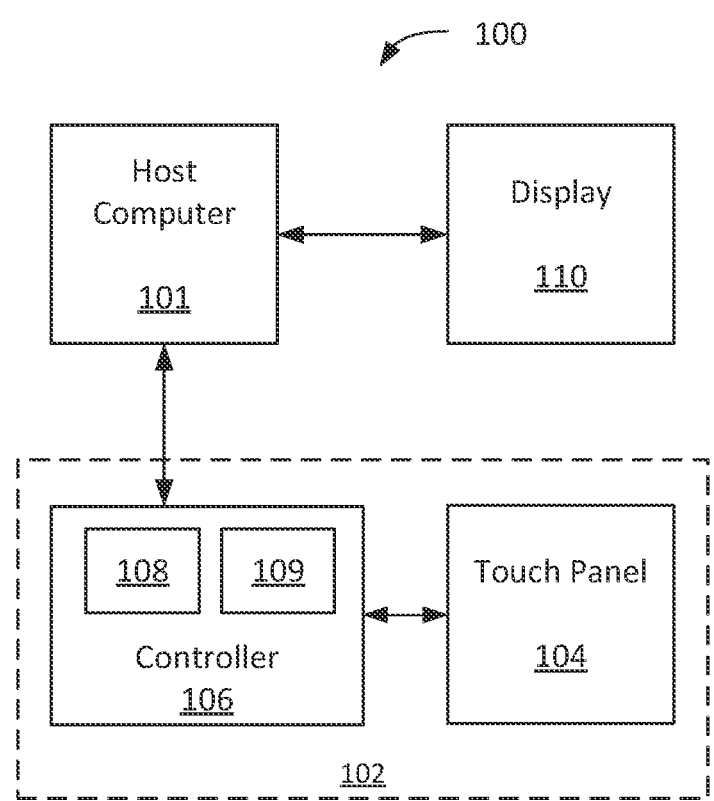
FIG. 1A is a functional block diagram of an example computing system that includes an example touch sensor system coupled to a host computing device, according to some embodiments.

FIG. 1A is a functional block diagram of an example computing system 100 that includes an example touch sensor system 102 coupled to a host computing device 101. The system 100 may implement one or more embodiments described herein.

The touch sensor system 102 includes a touch panel 104 coupled to a touch sensor controller 106. The touch panel 104. The controller 106 may include sensor control circuitry 108 configured to interact with and control the touch panel 104. The sensor control circuitry 108 may include one or more processors and memory storing processor-executable instructions for causing the one or more processors to perform touch sensor control functions. The processor(s) and memory may be implemented as a microprocessor and/or microcontroller. The microprocessor or microcontroller may be in the form of a touch sensor control chip. The control functions may include but are not limited to: outputting signals to drive the "transmit" channels of the touch panel; receiving signal outputs from the "receive" channels of the touch panel; and processing the signal outputs received from the touch panel to determine touch information such as touch contact location(s). The control circuitry 108 may be embodied as a touch sensor control chip.

The controller 106 may also include configuration circuitry 109 that implements one or more controller configuration methods described herein. The configuration circuitry 109 may be in the form of a microprocessor that is separate from the sensor control circuitry 108. In some embodiments, the sensor control circuitry 108 and the configuration circuitry 109 are integrated into a single microcontroller or other similar hardware unit. Various hardware and software arrangements and configurations may be used to implement the sensor control circuitry 108 and the configuration circuitry 109 described herein.

The controller 106 drives the touch panel 104 and receives output from the touch panel 104 (via the control circuitry 108). The output is processed to generate touch information that indicates the location(s) of touch(es) on the touch panel 104. The touch panel 104 may, for example, be a PCAP capacitive touch sensor with electrodes arranged in a pattern across a substrate, and the sensor control circuitry 108 may be a PCAP control chip. However, embodiments are not limited to a particular type of touch sensor or sensor control circuitry. For example, the system includes a resistive touch sensor in other embodiments.

The host computing device 101 may be any suitable computing device capable of interacting with touch sensor system 102. The host computing device 101 may also be coupled to a display 110. In some embodiments, the display 110 may be positioned under the touch panel 104 such that the touch sensor system 102 and display together function as a "touchscreen." In other embodiments, the display 110 may be remote from the touch panel 104, and/or the system 100 may include a second display (not shown) arranged with the touch panel 104 for a touchscreen configuration. In still other embodiments, the display 110 may be omitted.

In a normal mode of operation of the controller 106, the controller 106 may output touch information to the host computing device 101. That is, the host computing device 101 in this example receives input from the touch sensor system 102 in the form of the touch information from the controller 106. In the normal mode of operation, the host computing device 101 may also control the display 110 based, at least in part, on the input (touch information) received from the touch sensor system 102. For example, where the display 110 is arranged with the touch panel 104 as a touchscreen, the display 110 may implement one or more controls. The controls may include buttons, sliders or other visual representations shown on the display 110 that correspond to zones (or regions) of the touch panel 104. Touch contacts located within those zones may activate the one or more controls accordingly. A variety of functionality may be implemented by the touch sensor system 102, host computing device 101 and display 110, and embodiments are not limited to any particular purpose or use of the system 100 or other similar systems.

Figure 1B:
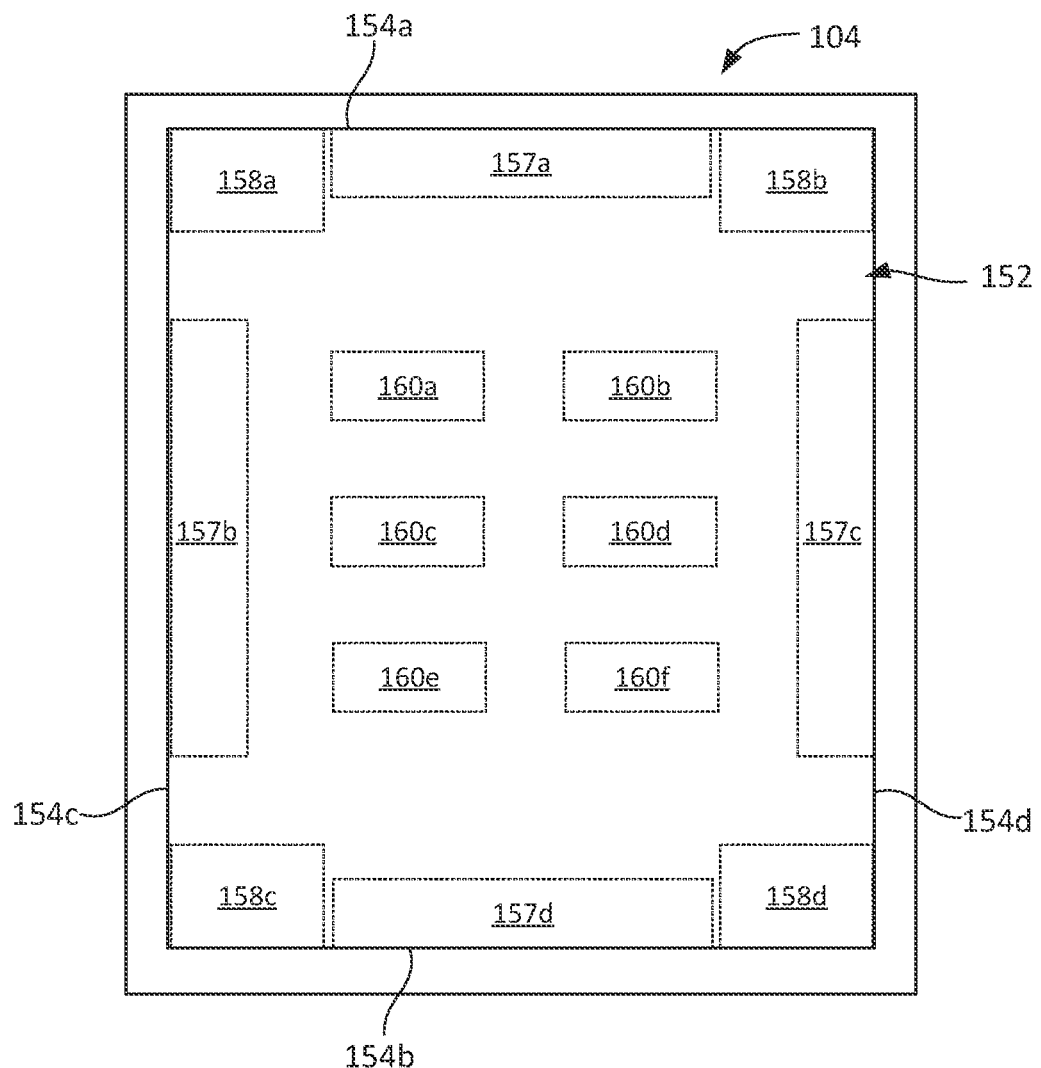
FIG. 1B illustrates a touch panel of the system of FIG. 1A.

FIG. 1B illustrates an example layout of the touch panel 104 of FIG. 1A, although embodiments are not limited to this particular example. The touch panel 104 has a sensor area 152 bounded by top edge 154a, bottom edge 154b, and side edges 154c and 154d. Touch contacts within the sensor area 152 of the touch panel 104 may be detected. Example zones of the sensor area 152 that may be designated by the controller 106 (FIG. 1A) as virtual controls are illustrated. In this example, these zones include top and bottom edge zones 157a and 157d, side edge zones 157b and 157c, four corner zones 158a to 158d, and additional example zones 160a to 160f for use as additional virtual buttons distributed in the sensor area 152.

The four edge zones 157a to 157d are each positioned near or adjacent a respective edge (154a to 154d) of the touch panel. The edge zones 157a to 157d each extends at least partially along the corresponding edge (154a to 154d). The corner zones 158a to 158d are each positioned at or near a respective corner of the sensor area 152. The number, size, length, width, and/o shape of these edge zones 157a to 157d and corner zones 158a to 158d may vary, and embodiments are not limited to the particular configuration shown in FIG. 1A. Similarly, the number, size, length, width, and/o shape of the remaining zones 160a to 160f may also vary.

Figure 2:
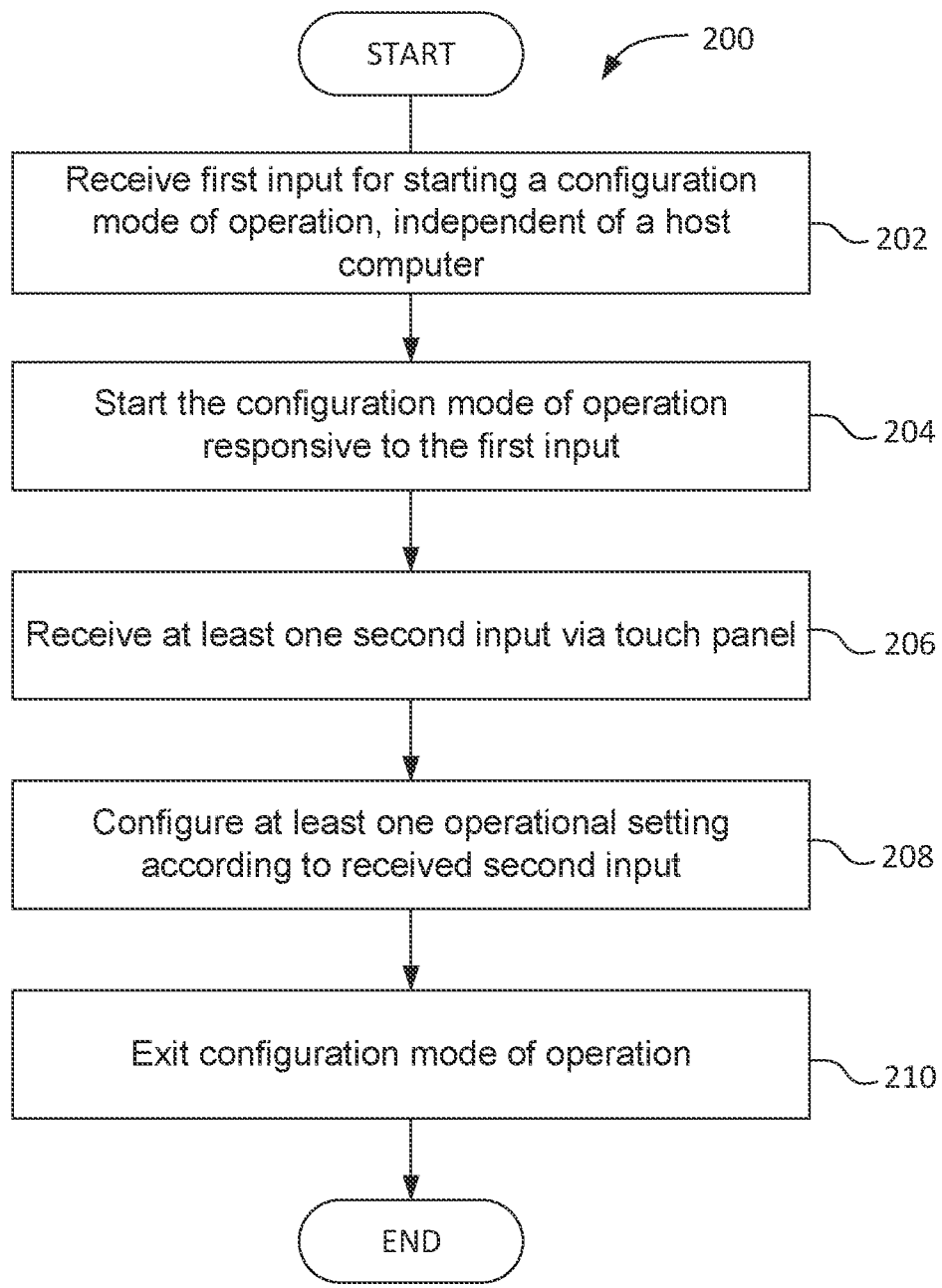
FIG. 2 is a flow diagram of an example method that may be performed by a touch sensor controller according to some embodiments.

FIG. 2 is a flow diagram of an example method 200 that may be performed by a touch sensor controller, such as the controller 106 in FIG. 1A. For example, the method 200 may be implemented by the configuration circuitry 109 of the controller 106. The method 200 may be implemented by the touch sensor controller 106 to allow configuration of the touch panel 104 in FIGS. 1A and 1B.

A block 202, the controller 106 receives, independent of the host computing device, first input for starting a configuration mode of operation. The first input may be received from the touch panel 104 or from another input device coupled to the touch sensor controller 106. The other input device may include, for example, a button coupled to the touch sensor controller 106. The touch sensor system 102 may be operating in a normal mode of operation at the time the first input is received.

The first input required to trigger the configuration mode of operation may include a certain input pattern, duration of one or more touches or touch patterns, and/or other characteristic(s). For example, the first input may be a unique set of one or more touches (possibly for a minimum duration to avoid accidental triggering). The one or more touches may be in one or more designated zones of the touch panel 104. Alternatively, that controller may include another input device (e.g. physical button) that must be pressed (possibly for a minimum duration). The minimum duration may, for example, be 1 or 2 seconds, or longer. The first input may comprise one or more gestures. Various examples of the first input are described herein, but embodiments are not limited to a particular types of first input.

The first input may be received independent of the host computing device 101. That is, the first input may be received independent of communication between the host computing device 101 and the controller 106.

At block 204, the configuration mode of operation is initiated by the controller 106 responsive to the received first input. In the configuration mode of operation, the controller 106 is operable to receive second input via the touch panel 104 for configuring at least one operational setting of the touch sensor system 102. Initiating the configuration mode of operation may also include ceasing the normal mode of operation. Ceasing the normal mode of operation may include stopping communication of touch sensor data to the host computing device.

Configuring the controller 106 to receive second input via the touch panel 104 may comprise mapping a plurality of zones of the touch panel 104 to a plurality of operational setting control functions according to a configuration control layout. Each of the plurality of zones of the touch panel 104 may be associated with a respective operational setting control. Each operational setting control may correspond to a respective one or more operational settings or adjustments to one ore more operational settings. The zones of the touch panel 104, thus mapped by the controller 106, function as "virtual" controls operable to receive user input to configure one or more of the operational settings. That is, a touch contact within a given designated zone of the touch panel associated with a corresponding operational setting control will activate or modify the corresponding operational setting(s). Such controls may take the form of "virtual" buttons, sliders, etc. as defined by the configuration control layout. Specific example static images of such virtual controls (where the images each represent a configuration control layout) are shown in FIGS. 4 to 11 and discussed in more detail below.

The term "virtual" used herein does not mean that buttons, sliders or other controls lack physicality. Rather, this term is used to signify that the "buttons" are not traditional movable buttons or slider switches. Rather, these "virtual" buttons and sliders are temporary controls implemented by the controller 102 as zones of the touch panel 104 associated with configuration functions for the duration of the configuration mode of operation. These "virtual" controls may differ from typical Graphical User Interface (GUI) controls implemented by the host computing device, in that the controls are implemented and monitored by the touch sensor controller, which may or may not be controlling the display. By way of further explanation, the virtual controls implemented by the controller may be independent of the host computing device.

Typical GUI controls (e.g. for a touchscreen) on the other hand are instead implemented by the host computing device and the host computing device interprets touch information to determine if/how the controls are activated.

In some embodiments, the controller 106 may provide an audible or visual indication that the configuration mode of operation has been initiated. For example, the controller 106 may include or be coupled to a light (e.g. Light Emitting Diode) that is activated or flashes. An LED may, for example emit green light to indicate the configuration mode of operation has begun. Alternatively, a beep or beep pattern for may be used to indicate that the mode of operation has been initiated. The controller 106 may include one or more visual and/or audio output means, such as an LED or speaker (e.g. buzzer). Alternatively, the controller 106 may be coupled to one or more visual and/or audio output means separate from the controller itself, and the controller 106 may provide output to activate such output means.

Initiating the configuration mode of operation may also include stopping or interrupting a normal mode of operation, as discussed above. During the configuration mode of operation the controller 106 may, thus, not forward touch information to the host computing device 101. This may prevent input received during the configuration process from being erroneously received or processed by the host computing device 101.

At block 206, the controller 106 receives at least one second input via the touch panel 104. The at least one second input may be for selecting or modifying one or more operational characteristics. For example, the user may touch one or more virtual buttons on the touch panel 104 for setting or altering the operational settings. The operational settings may include, but are not limited to: a sensitivity setting; maximum number of concurrent touches; a touch panel orientation setting; a reset setting; and a calibration setting. The sensitivity setting may control the sensitivity of the touch panel 104 at least in part by adjusting gain applied to signals received from the touch panel 104. For example, the configuration circuitry 109 may communicate the new gain setting to the sensor control circuitry 108 (shown in FIG. 1A). The "number of concurrent touches" setting may control the maximum number of concurrent touches on the touch panel 104 that the controller 106 may report to the host computing device 101. For example, this setting may select between single-touch and one or more multi-touch settings (e.g. 2-touch; 3-touch; 4-touch, etc.). The orientation setting may affect the manner in which the controller 106 defines location(s) of touches using touch information. The orientation of the touch panel 104 will be discussed in more detail below. A reset setting may, for example, be used to reset to factory settings.

Setting or modifying calibration settings may include receiving calibration data. Calibration data may include touch location information, such as one or more calibration points based on fiducial marks. For example, receiving calibration points may comprise a user pressing a series of fiducial marks in a defined order. The number of fiducial points that are used may vary (e.g. 4, 5, 9, 16, 25, or more fiducial points). Once a calibration has been performed, a corrective transformation may be applied to raw touch locations from the touch panel 104 to adjust them as a function of the data corresponding to fiducial points received during the calibration process. The computational transformation may, for example, be calculated and/or subsequently applied by the configuration circuitry 109 in FIG. 1A. In other embodiments, the transformation may be calculated by calibration software running on the host computing device 101 and relayed to the controller 106 for subsequent application. In still other embodiments, the controller 106 calculates and applies the corrective transformation, but the calibration process is controlled by calibration software running on the host computing device 101.

Other operational settings not specifically discussed herein may also be set or modified in other embodiments.

The received second input at block 206 may also comprise one or more touch gestures (e.g. pinch, slide, simultaneous touches, etc.). Gestures may be used instead or, or in combination with, virtual controls for configuring operations settings. The controller 106 may map (at block 204) one or more configuration control functions to one or more gestures, and the one or more gestures may then be used for adjusting operations settings. For example, a number of simultaneous touches by the user may be used to indicate a setting for the number of concurrent touches (e.g. one, two, five, etc.). A swipe gesture in a first direction (e.g. rightward) may be mapped to increasing touch sensitivity and a swipe gesture in a second direction (e.g. leftward) may be mapped to decreasing touch sensitivity. Swipe gestures in two different directions (e.g. upward and downward) may be mapped to increasing and decreasing maximum simultaneous touch inputs respectively. A double swipe gesture in a particular direction may be mapped to applying selected setting changes. A double swipe in another, possibly opposite direction may be mapped to returning to prior settings. A double swipe in still another direction (e.g. diagonal) may be mapped to applying factory settings. These are only a few examples for illustrative purposes. The gestures that may be used and the associated configuration control functions may vary.

At block 208, at least one of the operational settings is configured according to the received second input(s). This may comprise, for example, configuring the settings according to the received second input(s) and the configuration control layout.

The method may optionally further comprise, either before or after block 202, providing a static image that indicates the configuration control layout (e.g. showing a layout of the configuration controls). As one option, the host computing device may cause the display 110 to display the static image. For example, the user may cause the host computing device to display the image, or the controller 106 may send a signal to the host computing device 101 for causing the host computing device 101 to display the image. As another option, the user may be provided with a printed image, or print out the image, where the image is indicative of the configuration control layout. The printout may be on a transparent sheet, and the user may, for example, overlay the static image over or under the touch panel 104 so that the user can visually identify the virtual controls provided by the touch panel 104 when the controller 106 has initiated the configuration mode of operation. The sheet may be approximately the same size as the touch panel 104, or larger (with the image sized for the touch panel 104). For example, if the display 110 is positioned under the touch panel 104, the user may place the image over the display 110 and under the touch panel 104.

The static image may also indicate a control for starting and/or exiting the configuration mode of operation. The image may optionally include instructions for activating one or more of the virtual controls (e.g. duration of touch in a zone required to activate the control, etc.). Some specific examples of static images showing virtual control layouts that may be provided according to a configuration control layout will be described below with reference to FIGS. 4 to 11. Since the image is static (i.e. unchanging), display of the image for the duration of the configuration process may not require any communication between the host computing device 101 and the controller 106 during the configuration process. If the user already knows how to trigger access to the configuration mode of operation, they can choose to trigger the configuration mode of operation before displaying the image. Users may learn the configuration control layout and an activation method sufficiently that they do not even need to display or present an image.

Various forms of virtual controls and forms of touch input may be used to set or modify the operational settings once the controller 106 is in the configuration mode of operation (i.e. blocks 206 and 208 of FIG. 2). The controller 106 interprets received touches (which may include fixed touches and/or gestures) in the context of the known zones for the virtual controls as designated by the configuration control layout. The virtual controls may include types of virtual buttons, sliders, and/or other controls, and these virtual controls are shown on the static configuration image.

The controller 106 may provide a visual or audio indication that a configuration input has been received. The indication may, for example, include flashing an LED (on or off) or beeping in a defined manner (e.g. specific color, tone or duration) that signifies acknowledgement. For example, virtual buttons may correspond to different colors or tones. A virtual slider control may cause variable tone to be sounded (e.g. increasing pitch when the virtual slider is raised and a decreasing pitch when the virtual slider is lowered). The indication may even indicate quantitatively the selected setting (e.g. 1, 2 or 5 flashes to indicate the selected number of concurrent touches or 1 to 10 flashes to indicate sensitivity level).

As another example, for a calibration process, the visual or audio indication may be provided if a user presses a virtual button to make a configuration selection or touches a fiducial mark to enter a calibration point. The indication may be provided when the user touch (for the fiducial mark) has sufficient positional stability, duration and sufficient force. If touch positional stability is poor (e.g. reported touch location varies excessively) or touch duration is too short, a different visual or audio cue may be provided. For example, the LED may flash green for a successful calibration point received, and the LED may flash red for a failed calibration point. The user may have the opportunity to press the same fiducial mark again to continue the calibration process.

With reference again to FIG. 2, at optional block 210, the controller 106 exits the configuration mode of operation. The user may provide further input for exiting of the configuration mode of operation. The further input may be provided by touching an "exit" control provided by the configuration control layout. Alternatively, a button or other control coupled to the controller 106 may be used for exiting the configuration mode of operation. For example, the same physical button on the controller 106 may be used to enter and exit the configuration mode of operation. The controller 106 may automatically resume a normal mode of operation, resuming sending touch information to the host computing device 101 once the configuration mode of operation has ceased. The controller 106 may also stop visual or audio indication(s) corresponding to the configuration mode of operation and/or provide a different indication that normal operation has resumed.

The user may provide the input for exiting the configuration mode of operation once the user has entered all their desired configuration changes, and/or if a user decides to exit without saving changes. Several methods for triggering an exit may be implemented. A few non-limiting examples include: a virtual button for exiting the configuration mode of operation and/or applying settings that have been selected; an automatic timeout; a "cancel" virtual button that triggers an exit while discarding operational settings selected during the configuration mode of operation; and a "factory reset" or "restore factory configuration/calibration" button. Some exit methods, such as "cancel" or timeout, may exit the configuration mode of operation and restore settings to the state they were in immediately prior to entering the configuration mode of operation.

As noted above, configuration of the controller 106 for operation with the touch panel 104 may comprise adjusting a calibration setting (at blocks 206 and 208), which may involve a calibration process in which multiple touch contacts based on fiducial marks are detected. The calibration process may end automatically after the last fiducial mark touch has been made successfully. Confirming that the touches of the fiducial marks have been made successfully may comprise determining that the registered touch locations meet one or more suitability criteria, such as the touches demonstrating a threshold location stability. In such embodiments, no "exit" or "cancel" buttons from calibration operation may be required for exiting calibration. However, for some configuration settings, there may not be a clear indication of when a configuration is complete, and "exit" and/or "apply" controls may be provided. For example, virtual buttons that increase and decrease sensor sensitivity may not correspond to specific values and multiple presses may sometimes be used (meaning it may not be clear where the process ends without additional user input).

The method 200 of FIG. 2 may allow a user to manually configure one or more operational settings of the touch sensor system 100 independent of the host computing device 101, possibly exception of the host computing device 101 displaying the static image indicative of the configuration control layout. That is, blocks 202, 204, 206, 208 and/or 210 may be performed without the controller 106 receiving input from or being under control of the host computing device 101. In other embodiments, the host computing device 101 may be involved in one or more steps of the method. For example, the first or at least one second input may be provided using the host computing device 101.

The method 200 of FIG. 2 and variations thereof may provide multiple benefits over methods of configuring touch sensor systems using software on a host computing device. This configuration method may avoid challenges relating to creating, debugging, distributing and supporting dedicated computer software for user configuration via the host computing device. Rather than providing a separate software package for installation on the host computing device, the proprietor of the touch sensor system may only need to provide the static image(s) showing the configuration control layout (in either digital or physical form).

For proprietors of touch sensors with multiple aspect ratios, one digital static image (e.g. JPEG or TIF file) may be provided for each aspect ratio, and users may display the images in a full screen mode. This may avoid a user needing to "stretch" an image with the wrong aspect ratio to full screen on their system. A configuration control layout may, however, have a single size and be based on relative X/Y positioning relative to sensor width and height, such that a single image may be "stretched" to fit different touch sensor sizes and aspect ratios. Host computing devices may typically be running an operating system that allows for images to be displayed on an electronic display in various sizes and aspect ratios. Aspect ratios that may be supported include, but are not limited to: 16:9, 9:16, 5:4, 4:5, 4:3, 3:4, 16:10, and 10:16.

Where a physical (e.g. printed) static image is provided, the image may be printed on a medium that matches the size of the touch sensor. Printing on a medium that is at least partially transparent may make it easier to align the image on top of the touch sensor. The sheet may comprise mylar or any other suitable material, for example. The static image may also include instructions explaining use of the controls and/or other information for the user (e.g. contact information, website URL, etc.).

As another potential advantage, the method described herein may avoid the need to develop and support multiple variants of configuration software on multiple possible operating systems that may be used by host computing devices. It also may not be necessary to work around multiple virus protection programs that may run on each of these operating systems. It also may not be necessary to overcome the many varied anti-virus barriers facing a piece of software (for every combination of every operating system and antivirus software). Additionally, communication between the host computing device 101 and controller 106 may be limited to touch information, thereby avoiding the need for additional methods of communication between the controller and host computing device. This may provide added security and avoid nefarious activity possible through more complex or additional communication channels.

Since the configuration mode of operation is essentially independent of the host computing device 101, the host computing device 101 may be directed to communicate with the controller 106 only for receiving touch information (e.g. coordinates). In the case of a USB interface between the host computing device 101 and the controller 106, the host computing device 101 may ignore all USB communication with the controller 106 that isn't specifically related to reporting touch coordinates. This may add a level of security as other communication links, which may be an avenue of attack by a nefarious USB device, may be ignored by the host computing device 101.

In USB terminology, the host computing device 101 can ignore almost all of the USB 'configurations', their 'interfaces' and in turn their 'reports', all as established during USB 'enumeration' of the USB touch screen device. The host computing device 101 may simply discard or ignore all USB communication except those few reports needed to communicate touch information from the controller 106 (i.e. USB "device") to the host computing device 101 (i.e. USB "host"). If the controller 106 supports multi-touch, the controller 106 may also provide an indication of maximum number of touches to the host computing device 101 (e.g. in response to a request from the host computing device 101).

Turning again to block 202 of FIG. 2, various methods may be used to trigger the configuration mode of operation. For example, for embodiments where the first input to trigger the configuration mode of operation is received via the touch panel 104, a configuration mode activation control may be provided on the touch panel (i.e. by mapping at least one zone of the touch panel to the configuration mode activation control function). The first input may then comprise a touch contact on the touch panel within that zone designated for the configuration mode activation control.

Various factors may be considered for determining the form of the first input required for triggering the configuration mode of operation. A few such factors or considerations are as discussed below. However, embodiments are not limited to a particular method for triggering initiation of the configuration mode of operation.

It may be desirable for the configuration triggering step to be appropriately secured against accidental activation (or access). The designated input for triggering the configuration mode of operation may be chosen to: (a) be unlikely to be encountered in the normal operation of the computer system; and (b) be unlikely to have significant effects on the host computing device if the input is only partially entered or unsuccessfully entered. For example, it may be beneficial to avoid use of the very top-right corner of the screen because this is region is commonly used for "exit" buttons in many computer operating systems. Examples that may satisfy considerations (a) and (b) may include: holding a palm on a touch panel (e.g. for a minimum duration); a touch contact sustained for a long period, or a combination of sustained concurrent touches in designated zones.

Triggering options also include use of a button on the controller 106 (e.g. on a circuit board of the controller 106). The button may require a long press duration, a press button upon or soon after powerup, or a series of repeated presses. As another option, the triggering may require a unique and/or prolonged set of touches on the touch panel 104. As a specific example, a prolonged (e.g. 10 to 30 seconds) duration for a set of four touches may be required in specified locations. The specified locations could, for example, be zones along each of four edges of the touch sensor. Optionally, the user may be able to configure a higher security method of access (e.g. longer button press or touch durations). As another option, the button may not be normally accessible on the finished product (e.g. the button may be locked or in a secure location within the device). It may also be possible to "lock" the touch sensor controller during the configuration mode of operation to protect against further unwanted configuration or calibration. The terms "lock" and "unlock" as used herein may simply mean raising or lowering the security of the method of subsequently triggering the configuration mode of operation. Alternatively, an enclosure or housing may need to be physically opened to access the means (e.g. button) to trigger the configuration mode of operation.

It may also be desirable for the method of triggering the configuration mode of operation to not be excessively inconvenient to activate for the user. Some touch sensor systems are used in situations where it is unnecessary and undesirable to force users (e.g. technicians) to physically open up a housing of the system to access configuration/calibration controls. One such situation may be a secure industrial setting where quick configuration/calibration access may be preferred and there is little concern about triggering undesired or accidental access. In some settings, it may be important to leave a product hermetically sealed so configuration/calibration access via screen touches is the only option. In such cases, a higher security access trigger could include a series of unusual key press combinations and/or longer duration presses.

As another consideration, it may be desirable for the triggering method to be flexible so that the security/convenience trade-off is appropriate to the product (possibly by being one of the configurable settings itself). For example, in an ATM terminal or other kiosk terminal, it may be appropriate for the terminal to need to be opened (and an internal button pressed, for example) to allow access to configuration/calibration settings. In a factory, on the other hand, it may appropriate to allow access to configuration/calibration controls after 20 seconds of touching the screen in a unique way. Thus, to be flexible, it may be possible to switch between multiple methods of triggering the configuration mode of operation.

As another consideration, it may be desirable for the triggering method to be unobtrusive in the sense that any touches of the sensor that are part of activating/accessing can be done without having a negative effect on the software that may be running as the activation occurs.

Given the above considerations, the method of triggering the configuration mode of operation by touching anywhere along multiple (e.g. four) edges of the touch sensor for a minimum duration may be preferable because: i) it may avoid touches in the corners where other important functions (e.g. an "exit" control) may be located; ii) it may provide many choices for exactly where the operator touches to ensure that critical virtual controls and icons can be avoided; and iii) triggering the mode of operation may not require the touch to be released, so the configuration mode of operation can be initiated (and touches stop being forwarded to the host computing device 101) before the touches are released and therefore the host computing device may never receive therefore never act upon these triggering touches. Typical host computing device systems may respond to touches upon release.

Figure 3:
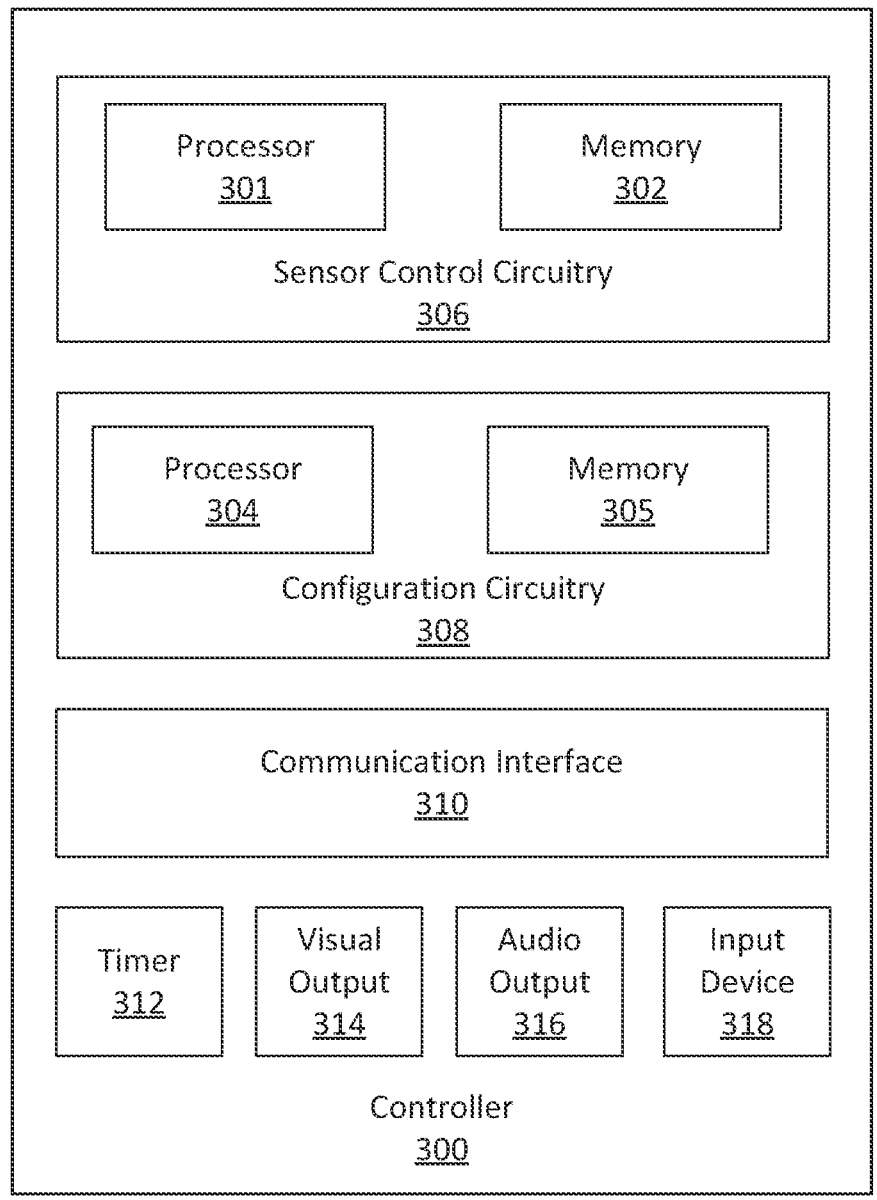
FIG. 3 is a functional block diagram of an example controller 300 that may implement the method of FIG. 2 according to some embodiments.

FIG. 3 is a block diagram of an example controller 300 for a touch sensor system that may implement the method of FIG. 2 according to some embodiments. The controller 106 in FIG. 1A may be in the form shown in FIG. 3.

The controller 300 comprises sensor control circuitry 306 that is configured to control a touch panel (such as the touch panel 104 in FIGS. 1A and 1B) and to process information received from the touch panel to generate touch information. The sensor control circuitry 306 comprises a processor 301 and a memory 302. The processor 301 may execute instructions stored on the memory 302 for performing the various control circuitry functionality described herein. The sensor control circuitry may, for example, be in the form of a touch sensor control chip.

The controller 300 further comprises configuration circuitry 308 and a communication interface 310. The communication interface 310 may be operable for communication with a host computing device (such as host computing device 101 in FIG. 1A) to communicate touch information and possibly other information to the host computing device.

The configuration circuitry 308 in this example includes a processor 304 and a memory 305. The processor 304 may execute instructions stored on the memory 305. The instructions stored on the memory 305 may cause the processor 304 to implement the methods of FIG. 2 or variations thereof. The configuration circuitry 308 may implement the method of FIG. 2 (or variations thereof) by controlling other components of the controller 300, including the sensor control circuitry 306 and the communication interface 310. In some embodiments, the sensor control circuitry 306 and communication circuitry 308 may share one or more processors and/or memory, rather than having separate processors (301, 304) and memory (302, 305) as shown in FIG. 3. The processors 301 and 304 and memory 302 and 305 may also implement other components of the controller 300. Other combinations of hardware and software (e.g. firmware) may be used to provide the functionality of the controller 300 or variations thereof described herein.

The configuration circuitry 308 is operable to receive the first input for initiating the configuration mode of operation; initiate the configuration mode of operation responsive to the first input; receive the at least one second input for setting or modifying at least one operational setting; and apply the operations setting(s) thus configured. The configuration circuitry 308 may also implement other functions described herein including, but not limited to, providing visual and/or audio indications; receiving input to exit the configuration mode of operation and exiting the configuration mode of operation accordingly; ceasing communication with the host computing device (via communication interface 310) during the configuration mode of operation; and other functions described herein.

The controller 300 in this example also includes the following optional components: a timer 312 that may be used to determine whether an input has satisfied a minimum duration threshold; a visual output device 314 for providing visual indicator output (e.g. LED); an audio output device 316 for providing audio indicator output (e.g. speaker); and/or an input device 318 (e.g. button) for receiving input, such as input to initiate and/or exit the configuration mode of operation. In some embodiments, the controller may include driver firmware for controlling audio/visual indicators. The visual output device 314 and audio output device 316 may be external to and/or remote from the controller 300. The controller 300 may also include other components not specifically shown. Embodiments are not limited to the specific combination of components shown in FIG. 3.

FIGS. 4 to 11 illustrate various examples of static images indicating configuration control layouts and related instructions, either for display on an electronic display (e.g. via a host computing device) or by printing out the image on a sheet that may be laid over or under the touch sensor. The static images of FIGS. 4 to 11 may be used for configuring a touch sensor system including a controller (such as controller 106 of FIG. 1A and/or controller 300 of FIG. 3) and a touch panel (such as touch panel 104 of FIGS. 1A and 1B). However, embodiments are not limited to these particular static images or configuration control layouts. Additional and/or alternative controls, functions, and information may be provided in other embodiments.

Figure 4:
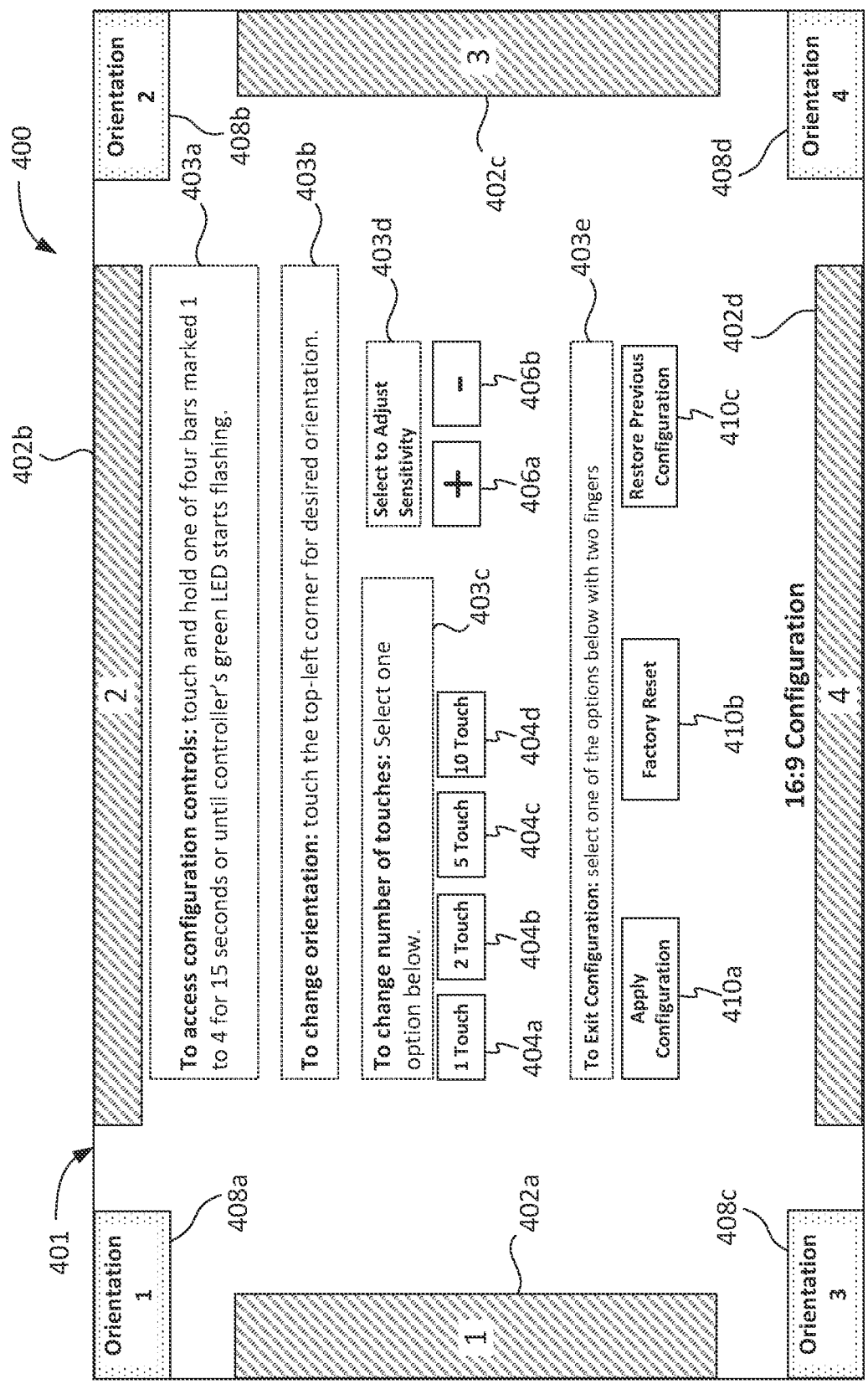
FIGS. 4 to 11 illustrate example static images that indicate configuration control layouts and user instructions according to some embodiments.

FIG. 4 shows an example static image 400 that may be provided to assist configuration of a touch panel having a sixteen-by-nine aspect ratio in a landscape orientation. The static image may assist a user to configure the controller 106 of FIG. 1A or the controller 300 of FIG. 3 for operation with a sixteen-by-nine touch panel. The static image 400 illustrates an example configuration control layout 401 and example instructions 403a to 403e for a user. The configuration control layout 401 includes a plurality of example virtual controls, which are discussed below, are represented visually in the image 400. These visual representations in the image 400 correspond to controls provided on the touch panel by the controller during the configuration mode of operation.

In this example, four edge zones in the form of edge zone bars 402a to 402d (also labelled as bars "1" to "4" in the image 400) are provided near or adjacent the four outer edges of the image 400 (corresponding to the four outer edges of the sensing area of the touch panel). The bars 402a to 402d may be used for activating the configuration mode of operation. In this example, as per user instruction 403a, a user may trigger the configuration mode of operation by touching and holding one of the four edge zone bars 402a to 402d for 15 seconds or until an LED on the controller starts flashing to confirm that the mode has initiated. Other trigger methods and/or confirmation methods may be used. As an alternative example, the first input to trigger the configuration mode of operation may, for example, be generated by a user touching all four bars 402a to 402d simultaneously for a minimum duration.

Virtual buttons 404a to 404d are illustrated for selecting between 1-touch, 2-touch, 5-touch and 10-touch operation. Instruction 403c may be included to select one of these buttons 404a to 404d. Additional virtual buttons 406a and 406b are illustrated and are for increasing and decreasing sensitivity respectively. Orientation controls (virtual buttons) 408a to 480d are provided in the four corners of the image 400 (corresponding to corner zones of the touch panel). A user may select one of the controls 408a to 408d to designate an upper left corner of the touch panel, for example. Exit controls 410a to 410c are provided, respectively, for: applying the selected configuration; returning or resetting to factory configuration; and restoring previous configuration (i.e. before the configuration mode of operation was triggered). As per user instruction 403e in this example, the user may select one of the exit controls 410a to 410c with two fingers to exit the configuration mode of operation and resume normal operation. Other controls and/or touch requirements may also be used.

In some embodiments, safeguards may be implemented for the event of accidental extreme changes to touch sensor sensitivity. For example, a customer might reduce sensitivity (using control 406a) to the point that subsequent touches cannot be detected. As one example, if no further user inputs are detected for a threshold duration, a timeout may be triggered that automatically cancels the configuration mode of operation and restores previous configuration settings, including an appropriate sensitivity setting. The controller (e.g. via configuration circuitry 109 in FIG. 1A) may automatically increase sensitivity if a lack of touches registered after the user adjusts sensitivity suggests sensitivity is too low. Conversely, safeguards may be implemented for the event that sensitivity is increased to an excessive level resulting in frequent false touches being registered. As one example, firmware of the controller may be configured to detect touch patterns characteristic of this situation and automatically cancel the configuration mode of operation and restore previous configuration settings, including an appropriate sensitivity setting. The controller (e.g. via configuration circuitry 109 in FIG. 1A) may also automatically decrease sensitivity to a default value or by a set step if the touch input indicates sensitivity is too high.

As one option to reduce likelihood of accidental extreme sensitivity changes, is to limit the number of gain steps allowed during the configuration mode of operation. This way, the touch sensor may remain sufficiently usable to re-enter the configuration mode operation and make further adjustments to the sensitivity if desired or needed.

In some embodiments, rather than "virtual button" controls 406a and 406b for increasing and decreasing sensitivity, a "virtual slider" control may be provided for increasing and decreasing sensitivity. In one example, a right-ward swipe within the slider is accepted as an instruction to apply an increase in sensitivity and a left-ward swipe accepted as an instruction to decrease sensitivity (or vice versa). Alternatively, the position of a touch within the slider area communicates the intended sensitivity. For example, a touch toward one side may indicate lower sensitivity; a touch near the middle may indicate medium sensitivity; and a touch toward the other side may indicate higher sensitivity. In this latter type of slider control, the corresponding fixed image might show a bar with numbers 0 to 10 below the slider, for example. Other variations are also possible.

Some touch sensors may operate with a different origin and axes of reported touch coordinates than the orientation of the display with which they operate. This may create ambiguity for users about which way the touch controller is oriented with respect to the display, which in turn may cause ambiguity regarding the required orientation of the image used for the configuration process. A touch sensor may, for example, treat the top left corner in a landscape orientation as the top left corner regardless of the actual orientation of the touch screen (e.g. rotated or flipped). In other words, the touch sensor may continue to operate as though it is in a particular landscape orientation, even if the touch sensor is positioned in alternate orientations. The host computing device, which applies the display orientation, may accept the touch coordinates in an alternate orientation of the touch screen and then make the same transformation to these coordinates as done for the display. In some embodiments, the touch sensor may include one or more sensors to automatically detect orientation. Such sensors may not, however, be able to detect orientation when the touch sensor is laid flat for a "table-top" orientation.

In some embodiments, the controller may automatically handle complexity arising out of the way touch systems may operate when they are reoriented. In some embodiments, a user may be able to configure the controller for touch sensor orientation to designate any one of the four corners as "upper left" corner touching one of the orientation controls 408a to 408d. To safeguard against users unknowingly selecting a non-standard orientation, three of the corners may be labelled as "non-standard" in the static image. A long press duration on the controls 408a to 408d may be required to prevent accidental activation of one of the four corner selection controls 408a to 408d. A visual or audio indicator may be provided to indicate that a corner is selected. The orientation selection may be adopted by the touch sensor system if the user chooses the "apply" button 410a to exit calibration operation. Use of the orientation controls 408a to 408d may not affect orientation in any way while configuration operation is still taking place.

Figure 5:
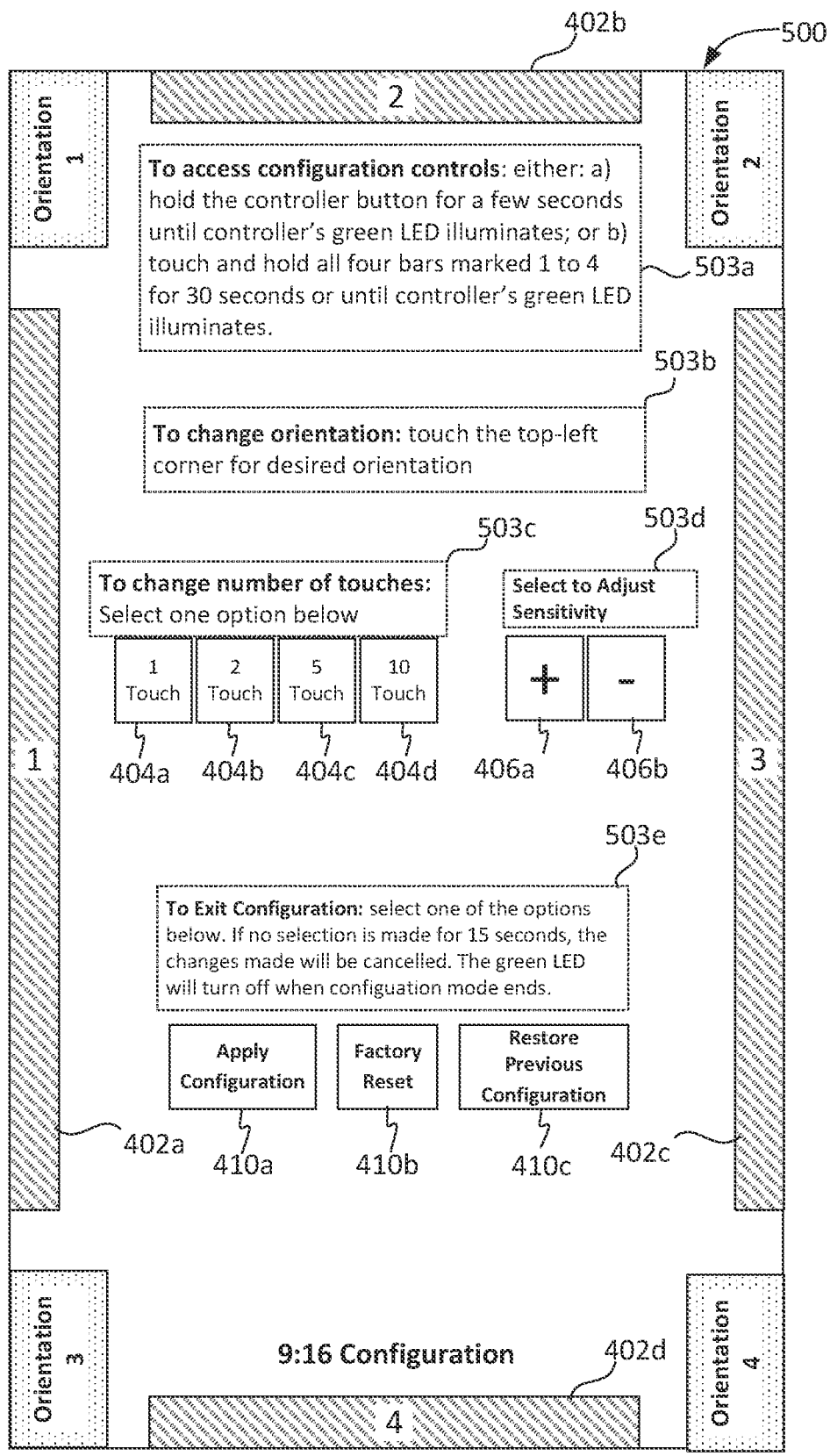

FIG. 5 shows an example static image 500 that may be provided to assist configuration of a touch sensor having a nine-by-sixteen aspect ratio in a portrait orientation. This example is similar to the example of FIG. 4, with like reference numbers denoting like elements, but with virtual controls re-arranged for the portrait orientation.

In the image 500 of FIG. 5, optional user instructions 503a to 503e are provided. Instructions 503b to 503d are the same as in the image 400 of FIG. 4. However, to trigger the configuration mode of operation in this example, a user may use the edge zone bars 402a to 402d, or the user may use a button (or other input device) provided on the controller for this purpose. To exit, in this example, per user instruction 503e, a user selects one of the exit controls 410a to 410c. If no selection is made for 15 seconds, the changes made during the configuration mode of operation will be cancelled. A visual indication may be provided to confirm the exit from configuration mode of operation, such as deactivating the LED that previously activated at the start of configuration.

Figure 6:
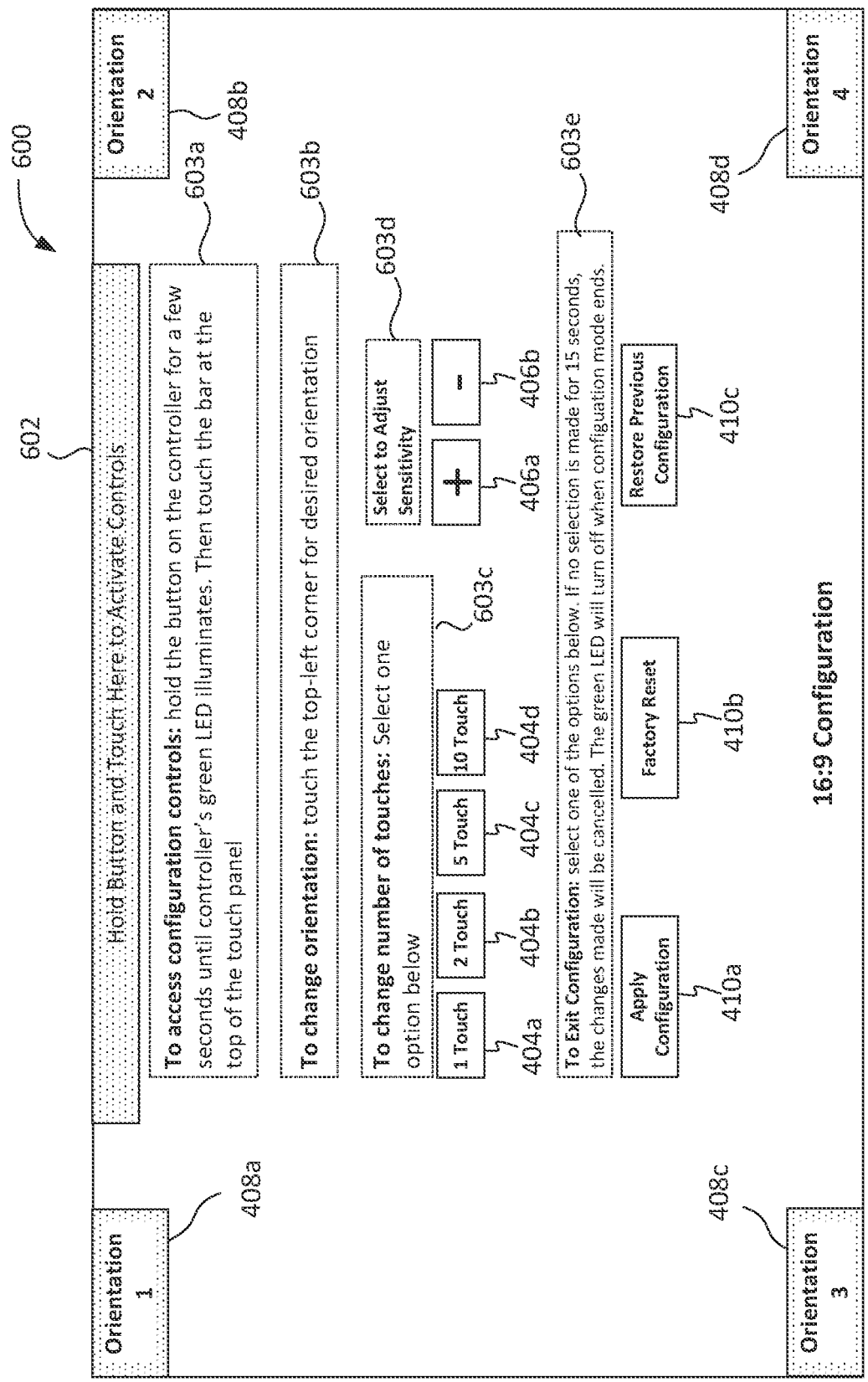

FIG. 6 shows another example static image 600 that may be provided to assist configuration of a touch sensor having a sixteen-by-nine aspect ratio in a landscape orientation. The image 600 shows representations of controls 404a to 404d, 406a, 406b, 408a to 408d and 410a to 410c that are similar to the corresponding virtual controls shown in FIG. 4, with like reference numbers denoting like elements. However, rather than four bars around the edges, the example image 600 includes only a single top bar control 602 at the top edge, which represents a control on the touch sensor for triggering the configuration mode of operation. A user may be required to press a physical button on (or coupled to) the controller and, while that button is pressed, touch the top bar control 602 on the touch screen. Optional user instructions 603a to 603e are provided, in which instructions 603b to 603e are the same as the example instructions 503b to 503e of FIG. 5. However, to trigger the configuration mode of operation, per user instruction 603a, the user may hold the button on the controller for a few seconds until controller's LED illuminates and then touch the bar at the top of the touch panel.

Since neither the typical user, nor the touch controller may be able to reliably know the relative orientations of the display vs the touch system coordinate system, it may be desirable for the user to be able to indicate their knowledge of display orientation to the touch system. This may be accomplished by allowing the user to touch a specific corner at the outset, or to touch near a specific one of the edges (e.g. "top" edge). For example, the top bar control 602 in FIG. 6 may be used to obtain input from the user indicating the user's understanding of the touch sensor orientation. This way, the controller may know the orientation from the user's point of view for the configuration process, and the layout of controls (i.e. zones) on the touch screen can be configured according to that orientation. The user can use the static image 600 or their memory of the fixed image 600, always with upright orientation from the user's point of view, having the same aspect ratio as their display. The controller may require the user to make an orientation selection before the rest of the configuration controls become available/active, which may provide a safeguard against ambiguity on control positions and/or undesired configuration inputs as a result.

Thus, requiring the top bar control 602 to be touched to trigger the configuration mode of operation may serve multiple purposes. First, this step may be required to activate virtual controls to prevent configuration controls from being active when there may still be ambiguity about orientation from the user's point of view. Second, touching the top bar control 602 causes the remaining configuration controls to adopt the selected orientation (the orientation having the touched edge at the top) for at least the duration of configuration mode of operation Thus, by this method: the relative orientation of the touch sensor and display may be reliably controlled during configuration mode of operation; the virtual controls represented in the static image may be correctly positioned relative to the touch sensor; and the user may correctly control touch screen orientation in their touch system.

The four corner orientation controls 408a to 408d related to control of touch screen orientation control are provided in this embodiment and are represented in static image 600 (though such controls may be omitted in other embodiments). These buttons may allow a user to select touch screen orientation to be set for normal operation that differs from the orientation that was used during the configuration mode of operation. This allows a user to properly set orientation for systems that use any relationship between display orientation and orientation of touch coordinates reported by the touch screen. This most often happens when a touch sensor is installed upside down (perhaps to address mechanical or other practical considerations). Less commonly, touch sensors and/or host systems use non-standard orientations for other reasons, so it is helpful to have a simple means of configuring the touch controller to bring the sensor and system into alignment.

Figure 7:
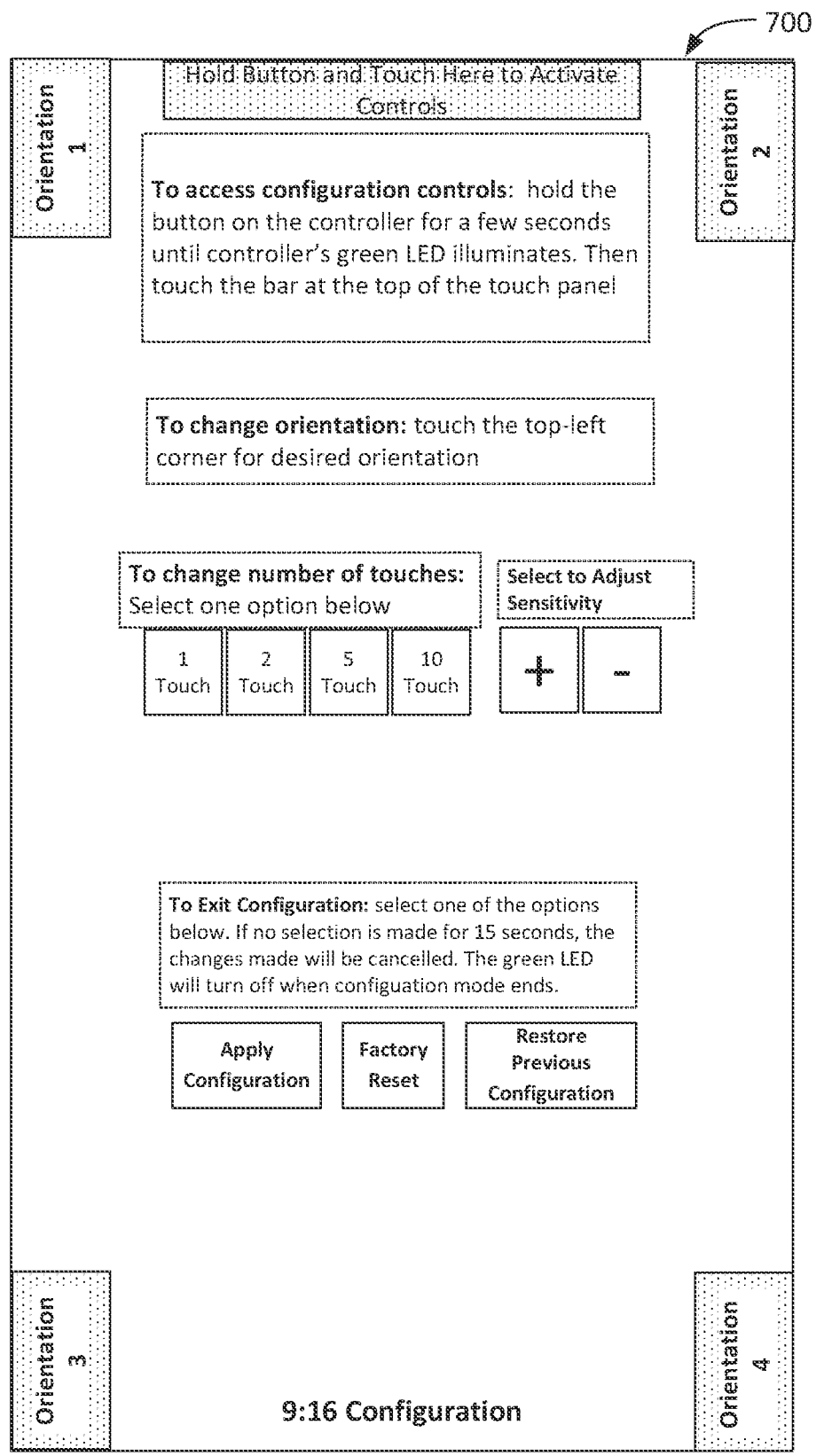

FIG. 7 shows an example static image 700 that may be provided to assist calibration of a touch sensor having a nine-by-sixteen aspect ratio in a portrait orientation. This example is similar to the example of FIG. 6, but with controls re-arranged for the portrait orientation.

Figure 8:
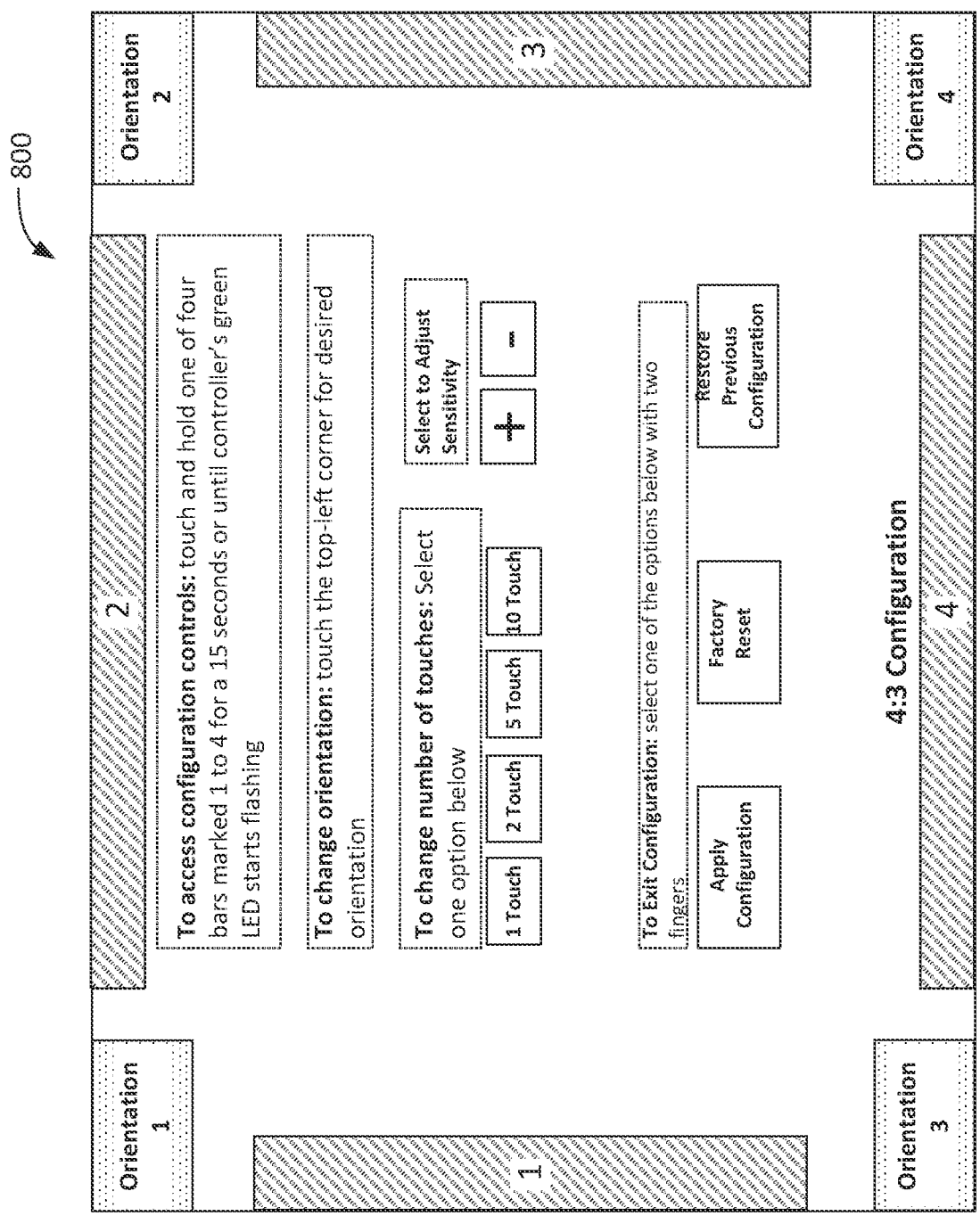

FIG. 8 shows an example static image 800 that may be provided to assist configuration of a touch sensor having a four-by-three aspect ratio in a landscape orientation. This example is similar to the example of FIG. 4, but with controls re-arranged for the four-by-three aspect ratio.

Figure 9:
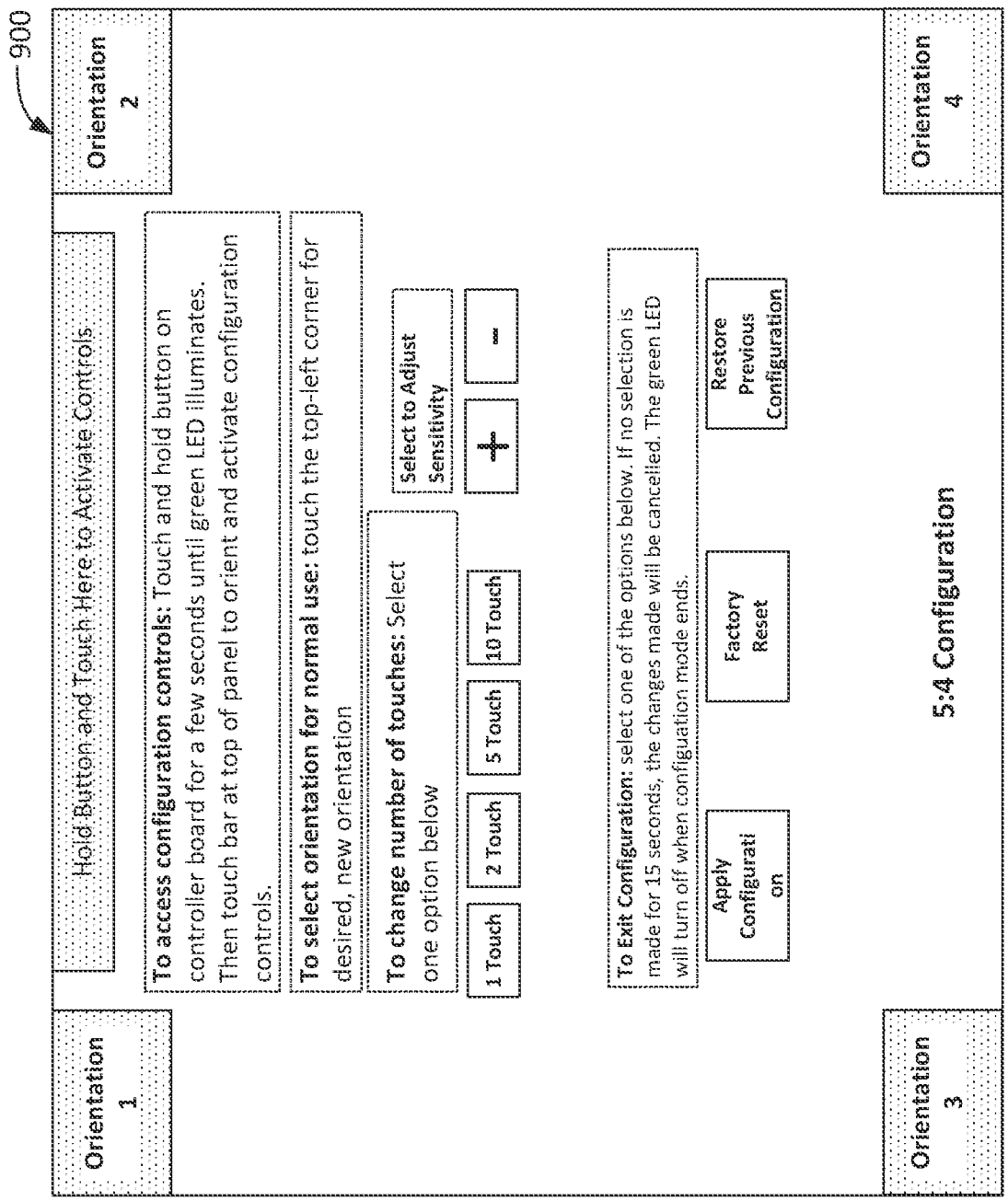

FIG. 9 shows an example static image 900 that may be provided to assist configuration of a touch sensor having a five-by-four aspect ratio in a landscape orientation. This example is similar to the example of FIG. 6, but with controls re-arranged for the five-by-four aspect ratio.

Figure 10:
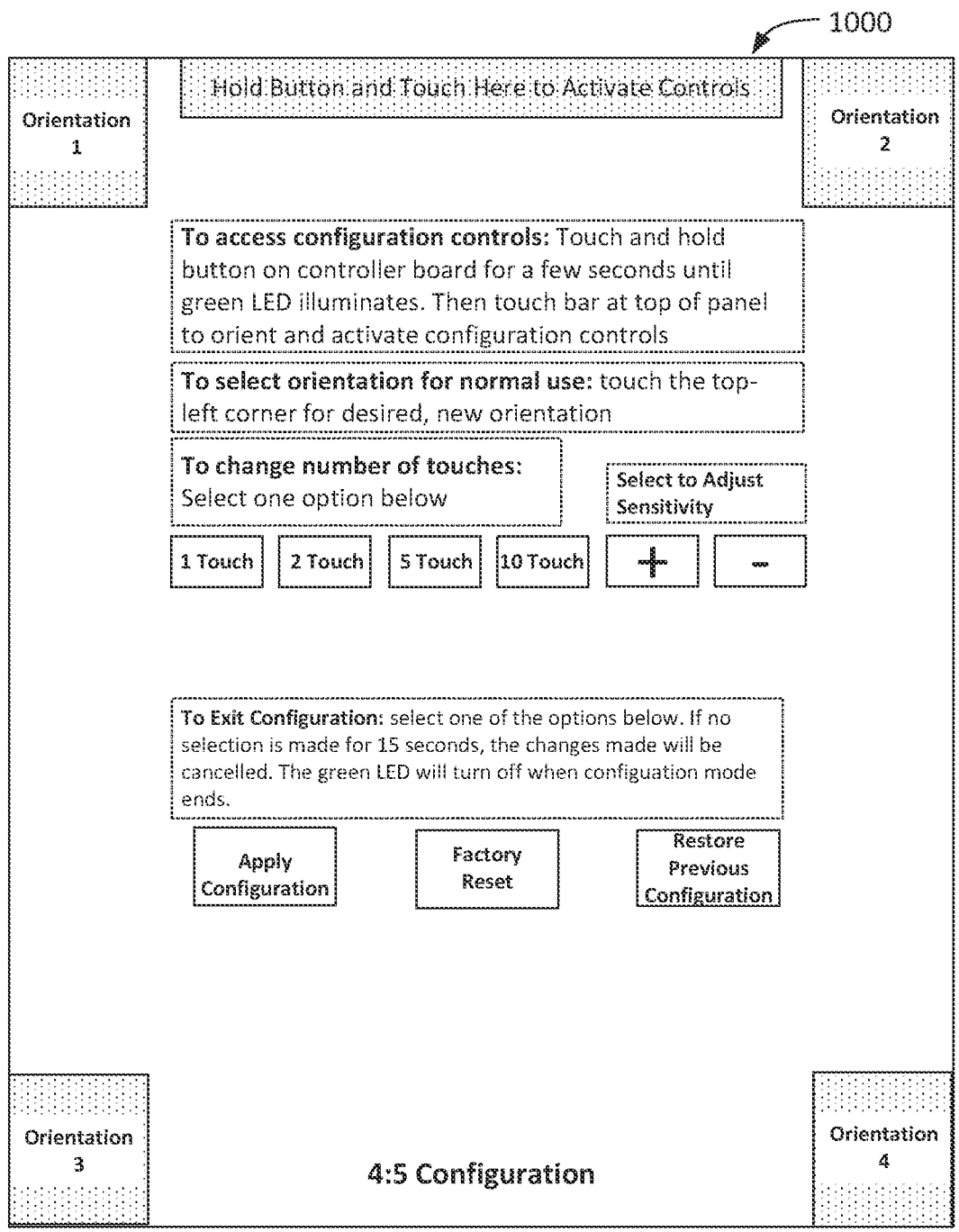

FIG. 10 shows an example static image 1000 that may be provided to assist calibration of a touch sensor having a four-by-five aspect ratio in a portrait orientation. This example is similar to the example of FIG. 9, but with controls re-arranged for the portrait orientation.

Figure 11:
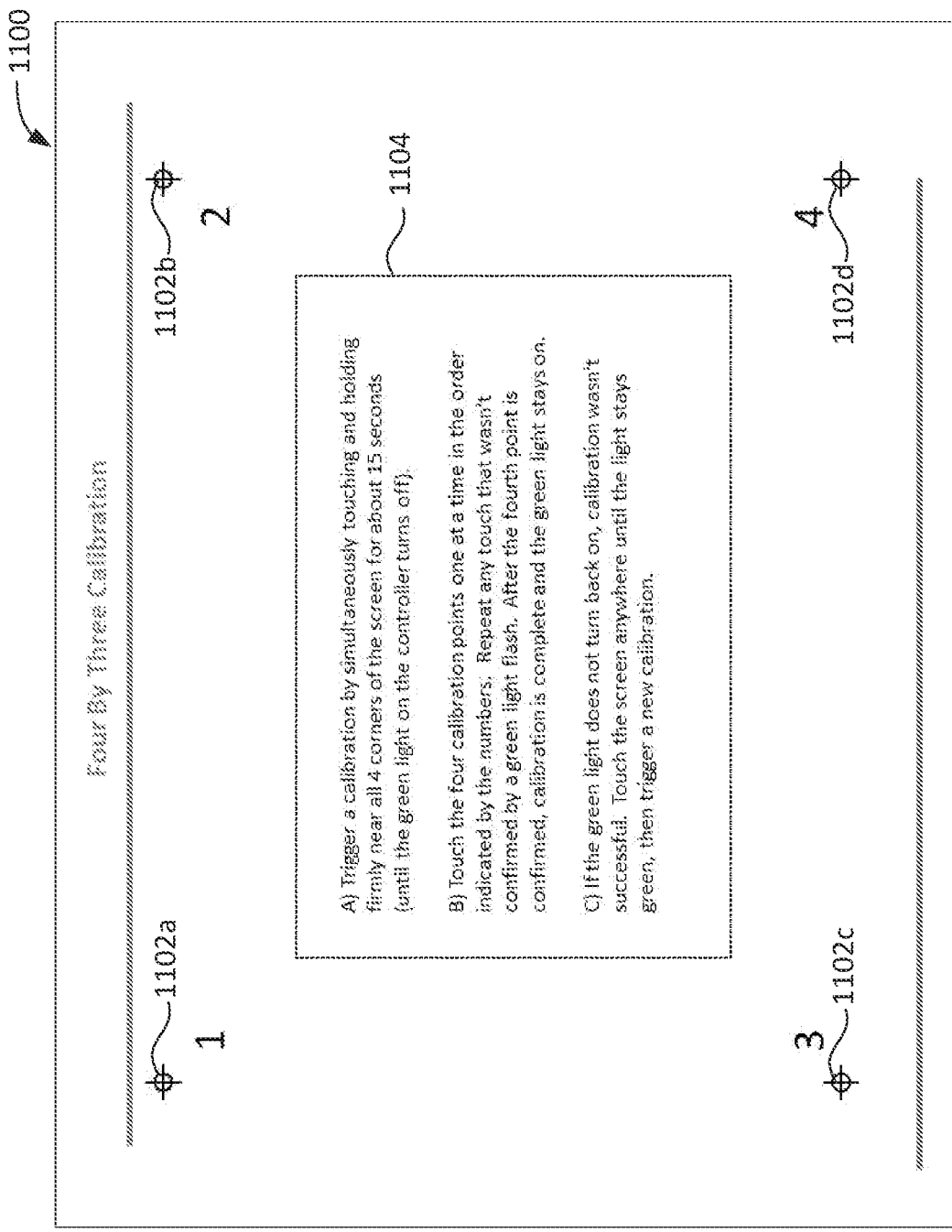

FIG. 11 shows an example static image 1100 that may be provided to assist configuration of a touch sensor having a four-by-three aspect ratio in a landscape orientation. The image 1100 shows visual representations of controls and instructions for a calibration process. The controls include four fiducial points 1102a to 1102d to be touched in a set order ("1" to "4") to complete the calibration process. Upon detection that the sequence of touches of the fiducial points 1102a to 1102d has completed, the controller may perform calibration as a function of the touches and automatically exit the configuration mode of operation. The controller may also return to normal operation, as calibrated.

The image 1100 in FIG. 11 also includes user instructions 1104 for implementing the calibration process according to this embodiment. In this example, the instructions include instructions (A), (B) and (C), by which:

(A) The user is instructed to trigger the calibration by simultaneously (or concurrently) touching and holding all four corners of the touch panel (i.e. screen in this embodiment) for approximately 15 seconds, until a light on the controller turns off. This triggering may be performed, in some embodiments, when the controller has initiated a configuration mode of operation. The controller may then initiate calibration (as part of the configuration process) in response to the triggering. Other input or combination of inputs may trigger the calibration. In some embodiments, the triggering the configuration mode of operation comprises triggering the calibration process.

(B) The user is instructed to touch the four fiducial points 1102a to 1102d in the order indicated by numbers "1" to "4". And the user is instructed to repeat any touch not confirmed by a green light flash. The means of providing confirmation of successful touches may vary, and a light is only an example. Other audio or visual cues may be used, or no cues may be provided. At completion of the sequence, further confirmation may be provided, which in this example, is the light staying on.

(C) The user is instructed, if the light does not turn on, that the calibration was not successful. The user may touch the screen anywhere until the light stays on (green in this example), and a new calibration process may be triggered.

This example calibration process (as guided by the user instructions 1104, is simply provided as an example. The details of the process illustrated by the instructions 1102 of FIG. 11 may vary while staying with the scope of the disclosure. The number and positioning of fiducial points may also vary.

In some embodiments, panel orientation may not be in question and the goal of calibration may simply be to fine-tune touch accuracy. In such cases, for example, fiducial marks could conceivably be touched in any order, and/or few user instructions may be needed in such cases. In other embodiments, the goals of calibration may include fine-tuning touch accuracy and determining touch panel orientation. In such cases, touching of multiple fiducial marks may be performed or instructed in an order that is at least partly pre-defined. User instructions to communicate the order to the user may be more useful in such a scenario. User instructions may be provided in various forms, and embodiments are not limited to instructions provided on a static image. For example, user instructions may be included in a manual or accessible by the host computing device.

The static images and controls represented in FIGS. 4 to 11 are provided only as examples. Additional configuration controls may be provided in other embodiments. Some controls shown in FIGS. 4 to 11 may also be omitted.

There may be benefits to leaving ample empty space in the control configuration layout to accommodate the addition or modification of controls in the layout over time. Over time, touch sensors and/or controllers may be updated with additional configuration functionality requiring new or modified configuration controls. The images of FIGS. 4 to 11 may also be updated accordingly. The user would use the configuration image(s) that align with their controller (and/or firmware) version. Zones for the newer configuration controls may be positioned in different locations than older versions, such that the new controls may have no effect when touched and an older version controller is being used.

The examples in FIGS. 4 to 11 each illustrate a single image or "page" of configuration controls and associated instructions that may be provided. In some embodiments, a controller for a touch sensor may implement multiple "pages" of configuration controls, where a user can provide input to select or scroll through the "pages". For example, activating a first "page" (or set) of controls could provide configuration controls for orientation, sensitivity and other settings, and a second "page" (or set) of controls could provide calibration controls. A first activation input could activate the first set or "page" and a second activation input could activate the second set or "page". One of the controls provided in one of the "pages" could be for activating the other of the "pages" and vice versa. For example, a control may be designated as "PAGE 2" or "ADVANCED SETTINGS" and may labelled as such on the static image. As with other controls discussed herein, a minimum threshold touch duration or multiple-touch may be required to activate this control. Visual and/or audio indications could be provided to indicate that a change in the current set of controls has occurred, or to indicate which set of controls (or "pages") is currently active.

In some embodiments, the controller may be operable in both a configuration mode of operation and a separate calibration mode of operation. Different respective inputs may trigger each of the configuration mode of operation and the calibration mode of operation. That is, one input may be required for triggering the configuration mode of operation, and another, different input may be required for triggering the calibration mode of operation. Alternatively or in addition, the configuration mode of operation and/or the calibration mode of operation may be automatically triggered by the controller (e.g. controllers 106 or 300 in FIGS. 1A and 3) upon detection of one or more criteria.

The one or more criteria may indicate that configuration and/or calibration is/are needed. The one or more criteria may include: installation of a new touch sensor and/or detection that a new touch sensor has one or more different characteristics than a previous touch sensor. The different characteristics for the new capacitive touch sensor be a number or ratio of rows and columns, for example. As a more specific example, if a new PCAP touch sensor has more rows than columns, whereas a previous PCAP touch sensor coupled to the controller had more columns than rows, then this new PCAP touch sensor likely needs to have its orientation setting adjusted. As another example, when replacing a current resistive touch sensor with a new resistive touch sensor, the new resistive touch sensor will likely need calibration. Thus, upon detecting such conditions, the controller may automatically start the configuration and/or calibration mode of operation accordingly. An indication to the user may be provided to alert the user to this change in operation.

In embodiments where the controller is operable to control a display (as discussed below), the controller may display an indication of the change in mode of operation. The security level for automatically controlling the display and/or starting configuration or calibration may vary, and the method of access for these modes of operation may vary depending upon the criteria detected by the controller.

In some embodiments, the controller may have its own separate connection to the electronic display (independent of the host computing device). For example, the touch sensor may be integrated with an electronic display in a touchscreen configuration, where the display is coupled directly to the controller, and the controller may include a display driver. In such embodiments, when the configuration mode of operation is activated, the controller may cause the display to stop displaying images provided by the host computing device and instead display the controller's own configuration images. In this case, the images could be dynamic and with responsive menus and controls, similar to the graphic user interfaces provided by a computer operating system or other software, while still running the configuration mode of operation independent of the host computing device.

The methods and controllers for configuring a touch sensor independent of the host computing device may be the only method available for manual configuration of the touch sensor of the system. In other embodiments, the controller may be configured to also be compatible with traditional configuration methods implemented by software executing on the host computing device. The user or manufacturer of a touch sensor system may be able to choose the desired method for configuring the touch sensor. Software on a host computing device for configuring a touch sensor may be able to read current configuration settings from the touch controller chip and display these on a display. The user may be able to then modify and choose new operational settings. This step may include a calibration process.

It is to be understood that a combination of more than one of the approaches described above may be implemented. Embodiments are not limited to any particular one or more of the approaches, methods or apparatuses disclosed herein. One skilled in the art will appreciate that variations or alterations of the embodiments described herein may be made in various implementations without departing from the scope of the claims.

The invention claimed is:

1. A method for configuring a touch sensor controller coupled to a touch panel and a host computing device, the method comprising:
receiving, by the touch sensor controller and independent of communication between the touch sensor controller and the host computing device, first input for starting a configuration mode of operation;
initiating, by the touch sensor controller, the configuration mode of operation responsive to the first input, wherein, prior to initiating the configuration mode of operation, the touch sensor controller communicates touch information to the host computing device, and wherein initiating the configuration mode of operation comprises stopping communication of touch information to the host computing device;
receiving, by the touch sensor controller, at least one second input via the touch panel for configuring at least one operational setting of the touch sensor controller; and
configuring, by the touch sensor controller, the at least one operational setting according to the received at least one second input.

2. The method of claim 1, wherein the at least one operational setting comprises at least one of: a sensitivity setting; a number of concurrent touches setting; a touch panel orientation setting; a reset setting; and a calibration setting.

3. The method of claim 1, wherein initiating the configuration mode of operation further comprises mapping a plurality of zones of the touch panel to a plurality of configuration control functions according to a configuration control layout.

4. The method of claim 3, wherein configuring the at least one operational setting comprises configuring the at least one operational setting according to the received at least one second input and the plurality of configuration control functions.

5. The method of claim 3, wherein each of the plurality of zones of the touch panel is configured as a respective configuration control operable to receive user input to configure a respective one or more of the at least one operational setting.

6. The method of claim 3, further comprising sending a signal to the host computing device for causing the host computing device to display, on a display coupled to the host computing device, an image indicative of the configuration control layout.

7. The method of claim 3, wherein mapping the plurality of zones of the touch panel to a plurality of configuration control functions and receiving the at least one second input is performed independent of communication between the touch sensor controller and the host computing device.

8. The method of claim 3, wherein the plurality of zones comprises one or more corner zones of the touch panel, the one or more corner zones being mapped to orientation control functions for selecting an orientation for normal operation of the touch panel.

9. The method of claim 3, wherein at least one of the first input or the at least one second input comprises one or more touch gestures.

10. The method of claim 9, wherein the first input is received via the touch panel.

11. The method of claim 10, further comprising implementing a configuration mode activation control on the touch panel, wherein the first input comprises a touch of the configuration mode activation control.

12. The method of claim 11, wherein receiving the first input comprises detecting that the touch of the configuration mode activation control has been continuous for at least a threshold duration.

13. The method of claim 1, wherein the touch sensor controller comprises an input device, and the first input is received from the input device.

14. The method of claim 13, wherein the input device comprises a button.

15. The method of claim 1, wherein the first input comprises one or more touches in one or more edge zones of the touch sensor.

16. The method of claim 15, wherein each of the one or more touches is in a respective different one of the one or more edge zones.

17. The method of claim 16, wherein each of the one or more touches is sustained for a defined duration.

18. The method of claim 15, wherein the one or more touches in one or more edge zone of the touch panel comprises one touch in one of the edge zones, and the touch sensor controller determines an orientation of the touch panel as a function of the one edge zone.

19. The method of claim 1, wherein if no touch panel input is received for a threshold time, the touch sensor controller ends the configuration mode of operation and reverts the at least one operational setting to a state prior to the initiation of the configuration mode of operation.

20. The method of claim 1, wherein further comprising, after initializing the configuration mode of operation, performing a calibration process, the calibration process comprising receiving input corresponding to a set of fiducial points.

21. A touch sensor system comprising:
   a touch panel;
   a controller coupled to the touch panel and a host computing device, the controller being operable to:
      receive, independent of communication between the controller and the host computing device, first input for starting a configuration mode of operation;
      initiate the configuration mode of operation responsive to the first input, wherein, prior to initiating the configuration mode of operation, the controller communicates touch information to the host computing device, and wherein initiating the configuration mode of operation comprises stopping communication of touch information to the host computing device;
      receive at least one second input via the touch panel for configuring at least one operational setting of the controller; and
      configure the at least one operational setting according to the received at least one second input.

22. A controller for a touch sensor system comprising a touch panel, the controller comprising:
   one or more processors; and
   memory storing processor-executable instructions that, when executed by the one or more processors, cause the one or more processors to implement a method comprising:
      receiving, independent of communication between the controller and a host computing device coupled to the controller, first input for starting a configuration mode of operation;
      initiating the configuration mode of operation responsive to the first input, wherein, prior to initiating the configuration mode of operation, the controller communicates touch information to the host computing device, and wherein initiating the configuration mode of operation comprises stopping communication of touch information to the host computing device;
      receiving at least one second input via the touch panel for configuring at least one operational setting of the controller; and
      configuring the at least one operational setting according to the received at least one second input.

* * * * *